United States Patent
Sawaya et al.

(10) Patent No.: US 12,522,703 B2
(45) Date of Patent: Jan. 13, 2026

(54) POLYMER FILM AND SUBSTRATE FOR COMMUNICATION

(71) Applicant: FUJIFILM Corporation, Tokyo (JP)

(72) Inventors: Takeaki Sawaya, Shizuoka (JP); Akira Yamada, Shizuoka (JP)

(73) Assignee: FUJIFILM Corporation, Tokyo (JP)

(*) Notice: Subject to any disclaimer, the term of this patent is extended or adjusted under 35 U.S.C. 154(b) by 611 days.

(21) Appl. No.: 17/948,198

(22) Filed: Sep. 19, 2022

(65) Prior Publication Data

US 2023/0022144 A1 Jan. 26, 2023

Related U.S. Application Data

(63) Continuation of application No. PCT/JP2021/010308, filed on Mar. 15, 2021.

(30) Foreign Application Priority Data

Mar. 27, 2020 (JP) ................. 2020-058348

(51) Int. Cl.
*C08J 5/18* (2006.01)
*C09K 19/38* (2006.01)

(52) U.S. Cl.
CPC .............. *C08J 5/18* (2013.01); *C09K 19/3809* (2013.01); *C08J 2300/12* (2013.01); *C09K 2219/03* (2013.01)

(58) Field of Classification Search
CPC ...... C08J 5/18; C08J 2300/12; C08J 2367/03; C08J 2453/00; C09K 19/3809; C09K 2219/03; C09K 2019/521; B29C 48/0022; B29C 48/04; B29C 48/05; B29C 2791/006; B29C 2793/0027; B29C 48/144; B29B 7/726; B29B 7/82; B29B 7/86;

(Continued)

(56) References Cited

U.S. PATENT DOCUMENTS

| | | | |
|---|---|---|---|
| 6,296,930 B1 | 10/2001 | Ohbe et al. | |
| 2012/0009385 A1* | 1/2012 | Satou | C23C 18/30 428/141 |
| 2012/0262646 A1 | 10/2012 | Iwata et al. | |

FOREIGN PATENT DOCUMENTS

| | | |
|---|---|---|
| CN | 102667541 | 9/2012 |
| JP | H0543664 | 2/1993 |

(Continued)

OTHER PUBLICATIONS

English Translation for Morita (WO 2012077317 A1) (Year: 2012).*
"International Search Report (Form PCT/ISA/210) of PCT/JP2021/010308," mailed on May 11, 2021, with English translation thereof, pp. 1-7.

(Continued)

*Primary Examiner* — Nathan L Van Sell
(74) *Attorney, Agent, or Firm* — JCIPRNET

(57) ABSTRACT

An object of the present invention is to provide a polymer film having a small anisotropy of linear expansion factor. Another object of the present invention is to provide a substrate for communication including the polymer film.

The polymer film of the present invention is a polymer film including a liquid crystal polymer, in which, in a case of observing a surface of the polymer film under a crossed nicol environment with a polarization microscope, a plurality of bright portions are observed in an observation region, and in the plurality of bright portions, an equivalent circle diameter of a bright portion having a maximum equivalent circle diameter is 10 μm or less.

20 Claims, 1 Drawing Sheet

(58) Field of Classification Search
CPC .... B29B 7/88; B29B 7/90; B29B 7/42; B29B 9/12; B29B 9/16; B29B 7/48; B29B 9/06; C08K 3/00; C08K 3/08; C08L 101/00
See application file for complete search history.

(56) References Cited

FOREIGN PATENT DOCUMENTS

| | | |
|---|---|---|
| JP | H11147999 | 6/1999 |
| JP | H11302402 | 11/1999 |
| JP | 2000080254 | 3/2000 |
| JP | 2002265804 | 9/2002 |
| JP | 2003062890 | 3/2003 |
| JP | 2006299254 | 11/2006 |
| JP | 2007197714 | 8/2007 |

OTHER PUBLICATIONS

"Written Opinion of the International Searching Authority (Form PCT/ISA/237)" of PCT/JP2021/010308, mailed on May 11, 2021, with English translation thereof, pp. 1-8.
"Office Action of Korea Counterpart Application", issued on Sep. 19, 2024, with English translation thereof, p. 1-p. 12.
"Office Action of China Counterpart Application", issued on Dec. 1, 2023, with English translation thereof, p. 1-p. 11.
"Office Action of Taiwan Counterpart Application", issued on Dec. 16, 2024, with English translation thereof, pp. 1-9.
"Notice of Reasons for Refusal of Japan Counterpart Application", issued on Nov. 7, 2023, with English translation thereof, p. 1-p. 6.
"Office Action of China Counterpart Application", issued on Jul. 11, 2024, with English translation thereof, p. 1-p. 10.

* cited by examiner

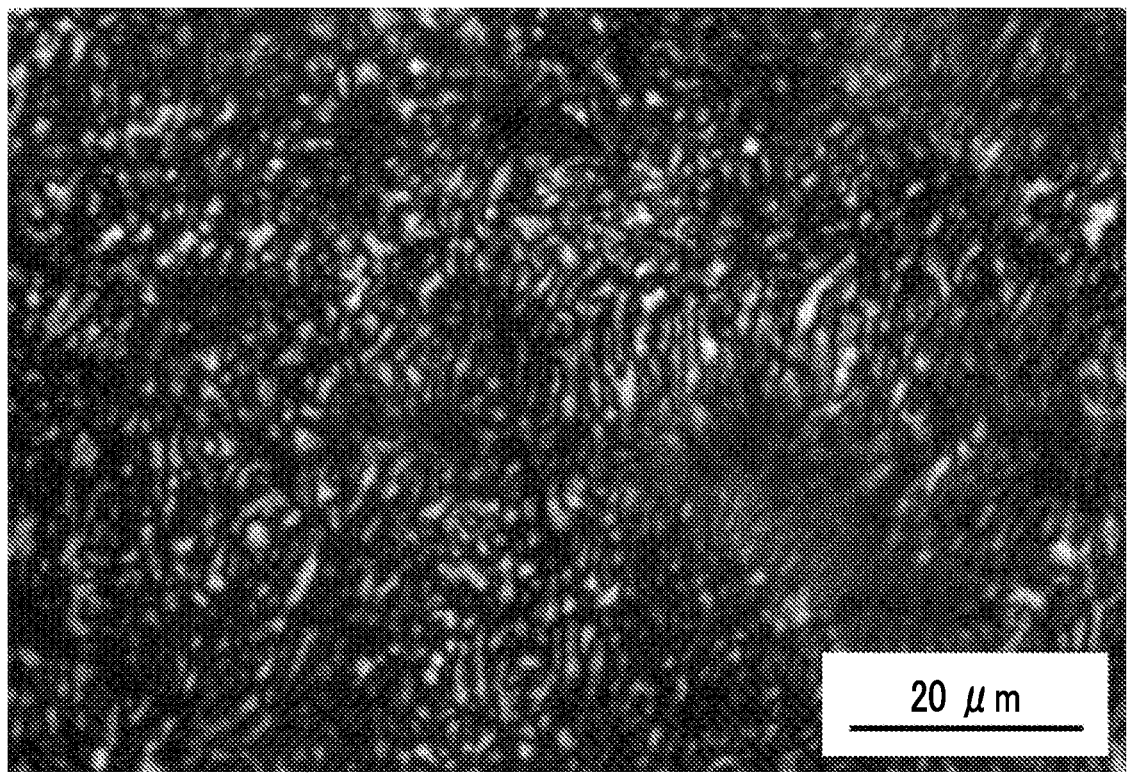

POLYMER FILM AND SUBSTRATE FOR COMMUNICATION

CROSS-REFERENCE TO RELATED APPLICATIONS

This application is a Continuation of PCT International Application No. PCT/JP2021/010308 filed on Mar. 15, 2021, which claims priority under 35 U.S.C. § 119(a) to Japanese Patent Application No. 2020-058348 filed on Mar. 27, 2020. The above application is hereby expressly incorporated by reference, in its entirety, into the present application.

BACKGROUND OF THE INVENTION

1. Field of the Invention

The present invention relates to a polymer film and a substrate for communication.

2. Description of the Related Art

Higher frequencies and wider bands than ever before have been used in a 5th generation (5G) mobile communication system, which is considered to be next-generation communication technology. Therefore, as a substrate film for a circuit board for the 5G mobile communication system, a film having low dielectric constant and low dielectric loss tangent characteristics is required, and the film has been developed with various materials.

Examples of one of such a substrate film include a polymer film including a liquid crystal polymer (LCP). The polymer film including a liquid crystal polymer has a lower dielectric constant and a lower dielectric loss tangent than general polyimides and glass epoxy films in a 4th generation (4G) mobile communication system.

However, since the liquid crystal polymer has a rod-like molecular structure even in a molten state, the liquid crystal polymer has easy aligning properties. In a case of melt-extruding the liquid crystal polymer from a T-die for processing, the liquid crystal polymer receives shear stress in a die slit, the rod-like liquid crystal molecules are aligned in a machine axis direction (machine direction; MD direction), and the alignment is further advanced by a melt draw.

Therefore, in the polymer film manufactured by the melt extrusion, the liquid crystal molecules are a uniaxially aligned film along the MD direction, and have strong anisotropy. Due to this anisotropy, since the polymer film has different mechanical characteristics, dimensional stability, and electrical characteristics in the MD direction and a width direction (transverse direction; TD direction), in a case of processing into a circuit board, problems such as breakage and peeling of a conductive layer occur.

As a method for improving the anisotropy of the polymer film as described above, JP1993-43664A (JP-H5-43664A) discloses a method for obtaining a polymer film by an inflation molding using a liquid crystal polymer.

SUMMARY OF THE INVENTION

In a case where the polymer film is manufactured using a liquid crystal polymer with reference to JP1993-43664A (JP-H5-43664A), the present inventors have found that an anisotropy of linear expansion factor may increase, and there is room for improvement.

Therefore, an object of the present invention is to provide a polymer film having a small anisotropy of linear expansion factor. Another object of the present invention is to provide a substrate for communication including the polymer film.

As a result of intensive studies to solve the above-described problems, the present inventors have found that, in observing a surface of the polymer film under a crossed nicol environment with a polarization microscope, in a case where a plurality of bright portions are observed in an observation region and an equivalent circle diameter of a bright portion having the maximum equivalent circle diameter is 10 μm or less, the desired effect is obtained, and have completed the present invention.

That is, the present inventors have found that the above-described objects can be achieved by the following configurations.

[1]
A polymer film comprising:
a liquid crystal polymer,
in which, in a case of observing a surface of the polymer film under a crossed nicol environment with a polarization microscope, a plurality of bright portions are observed in an observation region, and
in the plurality of bright portions, an equivalent circle diameter of a bright portion having a maximum equivalent circle diameter is 10 μm or less.

[2]
The polymer film according to [1],
in which a proportion of a total area of the bright portions to an area of the observation region with the polarization microscope is 60% or less.

[3]
The polymer film according to [1] or [2], further comprising:
a component selected from the group consisting of inorganic particles and a polymer different from the liquid crystal polymer,
in which, in a case of observing a vertical cross section of the polymer film with respect to the surface of the polymer film with a scanning electron microscope, a plurality of island-shaped regions consisting of the components are observed in an observation region, and an equivalent circle diameter of the island-shaped regions is 0.001 to 10 μm.

[4]
The polymer film according to [3],
in which a proportion of a total area of the island-shaped regions to an area of the observation region with the scanning electron microscope is 1% to 60%.

[5]
The polymer film according to [3] or [4],
in which a material constituting the inorganic particles is at least one selected from the group consisting of silica, titanium oxide, barium sulfate, talc, zirconia, alumina, silicon nitride, silicon carbide, calcium carbonate, silicate, glass bead, graphite, tungsten carbide, carbon black, clay, mica, carbon fiber, glass fiber, and metal powder, and
the polymer is at least one selected from the group consisting of a thermoplastic resin and an elastomer.

[6]
The polymer film according to any one of [3] to [5],
in which a distance between the island-shaped regions is 0.0001 to 5 μm.

[7]
  The polymer film according to any one of [1] to [6],
    in which a proportion of a Young's modulus in a second direction in a plane of the polymer film orthogonal to a first direction to a Young's modulus in the first direction in the plane of the polymer film is 0.5 to 1.9.
[8]
  The polymer film according to any one of [1] to [7],
    in which a proportion of a dielectric loss tangent in a second direction in a plane of the polymer film orthogonal to a first direction to a dielectric loss tangent in the first direction in the plane of the polymer film is 0.5 to 1.5.
[9]
  The polymer film according to any one of [1] to [8],
    in which a proportion of a dielectric constant in a second direction in a plane of the polymer film orthogonal to a first direction to a dielectric constant in the first direction in the plane of the polymer film is 0.5 to 1.5.
[10]
  The polymer film according to any one of [1] to [9],
    in which a proportion of a linear expansion factor in a second direction in a plane of the polymer film orthogonal to a first direction to a linear expansion factor in the first direction in the plane of the polymer film is 0.5 to 1.8.
[11]
  The polymer film according to any one of [1] to [10],
    in which an arithmetic average surface roughness Ra of the surface of the polymer film is 400 nm or less.
[12]
  The polymer film according to any one of [1] to [11],
    in which a thickness is 5 to 1100 μm.
[13]
  A substrate for communication comprising:
    the polymer film according to any one of [1] to [12].

According to the present invention, it is possible to provide a polymer film having a small anisotropy of linear expansion factor. In addition, according to the present invention, it is possible to provide a substrate for communication including the polymer film.

BRIEF DESCRIPTION OF THE DRAWINGS

FIG. 1 is an example of an observation image obtained by observing a polymer film according to an embodiment of the present invention under a crossed nicol environment with a polarization microscope.

DESCRIPTION OF THE PREFERRED EMBODIMENTS

Hereinafter, the present invention will be described in detail.

Description of configuration requirements described below may be made on the basis of representative embodiments of the present invention in some cases, but the present invention is not limited to such embodiments.

In notations for a group (atomic group) in the present specification, in a case where the group is cited without specifying whether it is substituted or unsubstituted, the group includes both a group having no substituent and a group having a substituent as long as this does not impair the spirit of the present invention. For example, an "alkyl group" includes not only an alkyl group having no substituent (unsubstituted alkyl group), but also an alkyl group having a substituent (substituted alkyl group). In addition, an "organic group" in the present specification refers to a group including at least 1 carbon atom.

In the present specification, a (meth)acrylic resin represents an acrylic resin and a methacrylic resin.

In the present specification, in a case where a polymer film has an elongated shape, a first direction means a width direction (lateral direction, TD direction) of the polymer film, and a second direction means a longitudinal direction (MD direction) of the polymer film.

In the present specification, for each component, one kind of substance corresponding to each component may be used alone, or two or more kinds thereof may be used in combination. Here, in a case where two or more kinds of substances are used in combination for each component, the content of the component indicates the total content of the substances used in combination, unless otherwise specified.

In the present specification, "to" is used to refer to a meaning including numerical values denoted before and after "to" as a lower limit value and an upper limit value.

[Polymer Film]

A polymer film according to an embodiment of the present invention is a polymer film including a liquid crystal polymer, in which, in a case of observing a surface of the polymer film under a crossed nicol environment with a polarization microscope, a plurality of bright portions are observed in an observation region, and in the plurality of bright portions, an equivalent circle diameter of a bright portion having a maximum equivalent circle diameter (hereinafter, also referred to as a "maximum equivalent circle diameter of the bright portion") is 10 μm or less.

The polymer film according to the embodiment of the present invention has a small anisotropy of linear expansion factor. The details of the reason are not clear, but are presumed as follows.

It is presumed that the above-described bright portion observed by the polarization microscope is a portion where molecular chains of the liquid crystal polymer are aligned in the same direction and cured. That is, in a case where a size of the bright portion is small, it is considered that the portion where the molecular chains of the liquid crystal polymer in the polymer film are aligned in the same direction is reduced. As a result, it is presumed that the anisotropy of linear expansion factor of the polymer film is smaller.

[Liquid Crystal Polymer]

The polymer film according to the embodiment of the present invention includes a liquid crystal polymer. The liquid crystal polymer is preferably a melt-moldable liquid crystal polymer.

Examples of the liquid crystal polymer include a thermotropic liquid crystal polymer. The thermotropic liquid crystal polymer means a polymer which exhibits liquid crystallinity in a predetermined temperature range.

The thermotropic liquid crystal polymer is not particularly limited as long as it is a melt-moldable liquid crystal polymer, and examples thereof include a thermoplastic liquid crystal polyester and a thermoplastic polyester amide with an amide bond introduced into the thermoplastic liquid crystal polyester.

As the liquid crystal polymer, a thermoplastic liquid crystal polymer described in WO2015/064437A and JP2019-116586A can be used.

Preferred specific examples of the liquid crystal polymer include thermoplastic liquid crystal polyesters or thermoplastic liquid crystal polyester amides, which have a repeating unit derived from at least one selected from the group consisting of aromatic hydroxycarboxylic acid, aromatic or aliphatic diol, aromatic or aliphatic dicarboxylic acid, aromatic diamine, aromatic hydroxyamine, and aromatic aminocarboxylic acid.

Examples of the aromatic hydroxycarboxylic acid include parahydroxybenzoic acid, metahydroxybenzoic acid, 6-hydroxy-2-naphthoic acid, and 4-(4-hydroxyphenyl)benzoic acid. These compounds may have a substituent such as a halogen atom, a lower alkyl group, and a phenyl group. Among these, parahydroxybenzoic acid or 6-hydroxy-2-naphthoic acid is preferable.

As the aromatic or aliphatic diol, an aromatic diol is preferable. Examples of the aromatic diol include hydroquinone, 4,4'-dihydroxybiphenyl, 3,3'-dimethyl-1,1'-biphenyl-4,4'-diol, and acylated products thereof, and hydroquinone or 4,4'-dihydroxybiphenyl is preferable.

As the aromatic or aliphatic dicarboxylic acid, an aromatic dicarboxylic acid is preferable. Examples of the aromatic dicarboxylic acid include terephthalic acid, isophthalic acid, and 2,6-naphthalenedicarboxylic acid, and terephthalic acid is preferable.

Examples of the aromatic diamine, aromatic hydroxyamine, and aromatic aminocarboxylic acid include p-phenylenediamine, 4-aminophenol, and 4-aminobenzoic acid.

The liquid crystal polymer preferably has at least one selected from the group consisting of a repeating unit derived from aromatic hydroxycarboxylic acid, a repeating unit derived from aromatic diol, and a repeating unit derived from aromatic dicarboxylic acid.

Among these, the liquid crystal polymer more preferably has at least a repeating unit derived from aromatic hydroxycarboxylic acid, still more preferably has at least one selected from the group consisting of a repeating unit derived from parahydroxybenzoic acid and a repeating unit derived from 6-hydroxy-2-naphthoic acid, and particularly preferably has a repeating unit derived from parahydroxybenzoic acid and a repeating unit derived from 6-hydroxy-2-naphthoic acid.

In addition, as another preferred aspect, the liquid crystal polymer more preferably has at least one selected from the group consisting of a repeating unit derived from 6-hydroxy-2-naphthoic acid, a repeating unit derived from aromatic diol, a repeating unit derived from terephthalic acid, and a repeating unit derived from 2,6-naphthalenedicarboxylic acid, and still more preferably has all the repeating unit derived from 6-hydroxy-2-naphthoic acid, the repeating unit derived from aromatic diol, the repeating unit derived from terephthalic acid, and the repeating unit derived from 2,6-naphthalenedicarboxylic acid.

In a case where the liquid crystal polymer includes a repeating unit derived from aromatic hydroxycarboxylic acid, a compositional ratio thereof is preferably 50 to 65 mol % with respect to all the repeating units of the liquid crystal polymer. In addition, it is also preferable that the liquid crystal polymer has only repeating unit derived from aromatic hydroxycarboxylic acid.

In a case where the liquid crystal polymer includes a repeating unit derived from aromatic diol, a compositional ratio thereof is preferably 17.5 to 25 mol % with respect to all the repeating units of the liquid crystal polymer.

In a case where the liquid crystal polymer includes a repeating unit derived from aromatic dicarboxylic acid, a compositional ratio thereof is preferably 11 to 23 mol % with respect to all the repeating units of the liquid crystal polymer.

In a case where the liquid crystal polymer includes a repeating unit derived from any of aromatic diamine, aromatic hydroxyamine, or aromatic aminocarboxylic acid, a compositional ratio thereof is preferably 2 to 8 mol % with respect to all the repeating units of the liquid crystal polymer.

A method for synthesizing the liquid crystal polymer is not particularly limited, and the liquid crystal polymer can be synthesized by polymerizing the above-described compound by a known method such as a melt polymerization, a solid phase polymerization, a solution polymerization, and a slurry polymerization.

As the liquid crystal polymer, a commercially available product may be used. Examples of the commercially available product of the liquid crystal polymer include "LAPEROS" manufactured by Polyplastics Co., Ltd., "Vectra" manufactured by Celanese Corporation, "UENO LCP" manufactured by UENO FINE CHEMICALS INDUSTRY, LTD., "SUMIKA SUPER LCP" manufactured by Sumitomo Chemical Company, "Xydar" manufactured by ENEOS Corporation, and "Siveras" manufactured by TORAY INDUSTRIES, INC.

The liquid crystal polymer may form a chemical bond with a crosslinking agent, a compatible component (reactive compatibilizer), or the like, which is an optional component, in the liquid crystal polymer film. The same applies to components other than the liquid crystal polymer.

A content of the liquid crystal polymer is preferably 40% to 100% by mass, more preferably 60% to 99% by mass, and particularly preferably 80% to 97% by mass with respect to the total mass of the polymer film.

(Maximum Equivalent Circle Diameter of Bright Portion)

In the polymer film according to the embodiment of the present invention, the maximum equivalent circle diameter of the bright portion is 10 μm or less, and from the viewpoint that the effects of the present invention are more excellent, more preferably 4 μm or less and particularly preferably 2 μm or less.

The lower limit value of the maximum equivalent circle diameter of the bright portion is not particularly limited, but is preferably 0.001 μm or more, more preferably 0.005 μm or more, and particularly preferably 0.01 μm or more.

Here, the maximum equivalent circle diameter of the bright portion is measured as follows.

First, 20 different points of the polymer film are cut using a microtome along a direction parallel to a main surface of the polymer film (that is, a direction orthogonal to a thickness direction of the polymer film (in-plane direction)), and a flaky sample having a predetermined thickness (for example, 10 μm) is cut out to obtain 20 observation samples.

Next, 20 observation images corresponding to the observation region are obtained by observing the main surface of the observation sample from a normal direction under a crossed nicol environment with a polarization microscope. Here, the "under a crossed nicol environment" refers to a state in which angles formed by polarization axes of two polarizers sandwiching the observation samples are orthogonal to each other. As a magnification for observation, an appropriate magnification in a range of 10 to 1000 times is selected.

Next, for each of the 20 observation images, an outer circumference of the bright portion is traced, and a diameter of a circle having the same area as the traced region (equivalent circle diameter) is measured by an image analysis device. Thereafter, the maximum value of the equivalent circle diameter of the bright portion obtained from the 20 observation images is defined as the maximum equivalent circle diameter of the bright portion.

FIG. 1 is an example of an observation image obtained by observing a polymer film according to the embodiment of the present invention under a crossed nicol environment with a polarization microscope. As shown in FIG. 1, in the observation image, a bright portion which looks relatively bright and a dark portion which looks relatively dark are observed.

Examples of a method for keeping the maximum equivalent circle diameter of the bright portion within the above-described range include a method of adding at least one component of inorganic particles or polymer having a predetermined size, which will be described later, together with the liquid crystal polymer in the manufacturing of the polymer film, a method for adjusting a temperature, a discharge amount, and/or a rotation speed of screw in a case of melt-kneading pellets formed of the liquid crystal polymer with an extruder, a method for adjusting a retention time for pellets formed of the liquid crystal polymer to pass through an extruder and be discharged from a die, and a method of a combination of these methods.

(Area Ratio of Bright Portion)

From the viewpoint that the effects of the present invention are more excellent, a proportion of the total area of the bright portions to an area of the observation region with the polarization microscope (hereinafter, also referred to as an "area ratio of the bright portion") is preferably 60% or less, more preferably 55% or less, still more preferably 50% or less, particularly preferably 40% or less, and most preferably 30% or less.

The lower limit value of the area ratio of the bright portion is not particularly limited, but is preferably 1% or more, more preferably 2% or more, and particularly preferably 5% or more.

Here, the area ratio of the bright portion is calculated based on the observation image obtained in the method for measuring the maximum equivalent circle diameter of the bright portion described above.

Specifically, for each of the 20 observation images obtained as described above, the total area of the equivalent circle diameter of the bright portion is calculated, and a proportion (%) of the total area of the equivalent circle diameter of the bright portion to the total area of the observation image (that is, the observation region) is calculated. Thereafter, an arithmetic mean value in the 20 observation images is obtained, and defined as the area ratio of the bright portion.

Examples of a method for keeping the area ratio of the bright portion within the above-described range include the same methods as the above-described method for adjusting the maximum equivalent circle diameter of the bright portion.

[Component a (Inorganic Particles and Polymer)]

The polymer film preferably includes a component (hereinafter, also referred to as a "component A") selected from the group consisting of inorganic particles and a polymer different from the above-described liquid crystal polymer. As a result, it is easy to adjust the maximum equivalent circle diameter of the bright portion to the above-described range.

Among these, from the viewpoint that an equivalent circle diameter of an island-shaped region (described later) can be easily adjusted, the component A preferably includes a polymer.

From the viewpoint that the effects of the present invention are more excellent, a material constituting the inorganic particles is preferably at least one selected from the group consisting of silica, titanium oxide, barium sulfate, talc, zirconia, alumina, silicon nitride, silicon carbide, calcium carbonate, silicate, glass bead, graphite, tungsten carbide, carbon black, clay, mica, carbon fiber, glass fiber, and metal powder, and particularly preferably at least one selected from the group consisting of silica, titanium oxide, barium sulfate, talc, calcium carbonate, silicate, and clay.

From the viewpoint that it is easy to make the equivalent circle diameter of the island-shaped region (described later) within a desired range, an average primary particle diameter of the inorganic particles is preferably 5 to 10000 nm, more preferably 10 to 1000 nm, and particularly preferably 50 to 200 nm.

The particle diameter of the primary particle of the inorganic particles is measured by taking an image of the inorganic particles using a transmission electron microscope at an imaging magnification of 10,000 times, tracing the contour of a particle (a primary particle) with a digitizer on the printed particle image obtained by printing the inorganic particles on a printing paper so that the total magnification is 50,000 times, and calculating the diameter (the equivalent circle diameter) of the circle having the same area as the traced region. Here, the primary particle refers to an independent particle without being aggregated. The imaging using a transmission electron microscope is carried out by a direct method using a transmission electron microscope at an acceleration voltage of 300 kV. The observation and the measurement with a transmission electron microscope can be carried out using, for example, a transmission electron microscope H-9000 manufactured by Hitachi High-Tech Corporation and an image analysis software KS-400 manufactured by Carl Zeiss AG.

Here, as the average primary particle diameter for various particles described in the present specification, a catalog value is adopted in a case where a commercially available product is used.

In a case where a catalog value is not provided, the particle image taken as described above is used to obtain values from 500 particles, which are randomly selected, and an arithmetic mean of the obtained value is used.

The polymer is preferably at least one selected from the group consisting of a thermoplastic resin and an elastomer.

Examples of the thermoplastic resin include a polyurethane resin, a methacrylic resin, a polyester resin, a (meth) acrylic resin, a polystyrene resin, a fluororesin, a polyimide resin, a fluorinated polyimide resin, a polyamide resin, a polyamideimide resin, a polyether imide resin, a cellulose acylate resin, a polyether ether ketone resin, a polycarbonate resin, a polyolefin resin (for example, a polyethylene resin, a polypropylene resin, a resin consisting of a cyclic olefin copolymer, and an alicyclic polyolefin resin), a polyarylate resin, a polyether sulfone resin, a polysulfone resin, a fluorene ring-modified polycarbonate resin, an alicyclic ring-modified polycarbonate resin, and a fluorene ring-modified polyester resin. Among these, from the viewpoint that it is a general-purpose material, and the equivalent circle diameter of the island-shaped region (described later) can be easily adjusted, a polyolefin resin is preferable.

In the present specification, the elastomer refers to a polymer compound exhibiting elastic deformation. That is, the elastomer is defined as a polymer compound having a property of being instantly deformed according to an external force in a case where the external force is applied and of being recovered to an original shape in a short time in a case where the external force is removed.

The elastomer is not particularly limited, and examples thereof include an elastomer including a repeating unit derived from styrene (polystyrene-based elastomer), a polyester-based elastomer, a polyolefin-based elastomer, a polyurethane-based elastomer, a polyamide-based elastomer, a polyacrylic elastomer, a silicone-based elastomer, and a polyimide-based elastomer. Among these, from the viewpoint that it is a general-purpose material, and the equivalent circle diameter of the island-shaped region (described later) can be easily adjusted, a polystyrene-based elastomer is preferable.

The elastomer is preferably a hydrogenated product, and particularly preferably a hydrogenated product of a polystyrene-based elastomer. In a case where the elastomer is a hydrogenated product, heat stability or storage stability is improved. The hydrogenated product means a polymer having a structure in which an elastomer is hydrogenated.

Examples the polystyrene-based elastomer include a styrene-butadiene-styrene block copolymer (SBS), a styrene-isoprene-styrene block copolymer (SIS), a polystyrene-poly(ethylene-propylene) diblock copolymer (SEP), a polystyrene-poly(ethylene-propylene)-polystyrene triblock copolymer (SEPS), a polystyrene-poly(ethylene-butylene)-polystyrene triblock copolymer (SEBS), and a polystyrene-poly(ethylene/ethylene-propylene)-polystyrene triblock copolymer (SEEPS). Among these, from the viewpoint that the effects of the present invention are more excellent, SEBS is preferable.

As the polymer, from the viewpoint that the effects of the present invention are more excellent, a polyolefin resin is preferable, a linear or branched polyolefin resin is more preferable, a polyethylene resin or a polypropylene resin is still more preferable, and a polyethylene resin is particularly preferable.

From the viewpoint that the effects of the present invention are more excellent, a content of the component A is preferably 1% to 60% by mass, more preferably 2% to 20% by mass, and particularly preferably 5% to 15% by mass with respect to the total mass of the polymer film.

In a case where the polymer film includes the component A, in observing a vertical cross section of the polymer film with respect to the surface of the polymer film with a scanning electron microscope, a plurality of island-shaped regions consisting of the component A are observed in an observation region. In this case, the polymer film has a sea-island structure having a plurality of island-shaped regions consisting of the component A and a continuous region consisting of the liquid crystal polymer, and it can be said that the component A is dispersed in the liquid crystal polymer.

(Equivalent Circle Diameter of Island-Shaped Region)

From the viewpoint that it is easy to adjust the maximum equivalent circle diameter of the bright portion to the above-described range, and/or viewpoint that it is possible to reduce the arithmetic average surface roughness Ra of the surface of the polymer film, an equivalent circle diameter of the island-shaped region is preferably 0.001 to 10 μm, more preferably 0.005 to 5 μm, and particularly preferably 0.01 to 1 μm.

Here, the equivalent circle diameter of the island-shaped region is measured as follows.

First, in 10 different points of the polymer film, the polymer film is cut so as to obtain a fractured cross section which is parallel to the first direction in the plane of the polymer film and perpendicular to the surface of the polymer film. In addition, in 10 different points of the polymer film, the polymer film is cut so as to obtain a fractured cross section which is parallel to the second direction (direction orthogonal to the first direction) in the plane of the polymer film and perpendicular to the surface of the polymer film.

Next, using a scanning electron microscope, the total of 20-point fractured cross sections (that is, the total of the 10 points of the fractured cross sections parallel to the first direction and perpendicular to the surface of the polymer film and the 10 points of the fractured cross sections parallel to the second direction and perpendicular to the surface of the polymer film) are observed to obtain 20 observation images corresponding to the observation region. The observation is performed by selecting an appropriate magnification in a range of 100 to 100,000 times, and the images are taken so that the entire region in the thickness direction of the polymer film can be observed.

Next, for any 200 island-shaped regions in the 20 observation images, an outer circumference of the island-shaped region is traced, and a diameter of a circle having the same area as the traced region (equivalent circle diameter) is measured by an image analysis device. Thereafter, an arithmetic mean value of the equivalent circle diameter of the 200 island-shaped regions is defined as the equivalent circle diameter of the island-shaped region.

Examples of a method for setting the equivalent circle diameter of the island-shaped region to the above-described range include a method of using inorganic particles having a predetermined average primary particle diameter in a case where the component A is inorganic particles, a method of using a predetermined type of polymer in a case where the component A is a polymer, a method of adjusting a shear rate in a case of pelletization described later, and a method of a combination of these methods.

(Area Ratio of Island-Shaped Region)

A proportion of the total area of the island-shaped regions to an area of the observation region with the scanning electron microscope (hereinafter, also referred to as an "area ratio of the island-shaped region") is preferably 1% to 60%, more preferably 1% to 50%, still more preferably 2% to 20%, and particularly preferably 5% to 15%. In a case of being the lower limit value or more, the effects of the present invention are more excellent. In addition, in a case of being the upper limit value or less, the surface of the polymer film can be smoothed.

Here, the area ratio of the island-shaped region is calculated based on the observation image obtained in the method for measuring the equivalent circle diameter of the island-shaped region described above.

Specifically, a random region (hereinafter, also referred to as a "selected region") is selected from each of the 20 observation images obtained as described above. Examples of the selected region include a square region of 10 μm in length×10 μm in width.

Next, an outer circumference of the island-shaped region existing in the selected region is traced, the total area occupied by the island-shaped region is measured by an image analysis device, and a proportion (%) of the total area of the island-shaped region to an area of the selected region is calculated. Thereafter, an arithmetic mean value in the 20 observation images is obtained, and defined as the area ratio of the island-shaped region.

Examples of a method for setting the area ratio of the island-shaped region to the above-described range include a method for adjusting the content of the component A with respect to the content of the liquid crystal polymer in a case of manufacturing the polymer film.

(Distance Between Island-Shaped Regions)

From the viewpoint that the effects of the present invention are more excellent, a distance between island-shaped regions is preferably 0.0001 to 5 μm, more preferably 0.001 to 1 μm, and particularly preferably 0.01 to 0.1 μm.

Here, the distance of island-shaped regions is calculated based on the observation image obtained in the method for measuring the equivalent circle diameter of the island-shaped region described above.

Specifically, a random region (hereinafter, also referred to as a "selected region") is selected from each of the 20 observation images obtained as described above. Examples of the selected region include a square region of 10 μm in length×10 μm in width.

Next, an outer circumference of the island-shaped region existing in the selected region is traced, and the shortest distance between different island-shaped regions is measured by an image analysis device. Thereafter, an arithmetic mean value in the 20 observation images is obtained, and defined as the distance between island-shaped regions.

Examples of a method for keeping the distance of island-shaped regions within the above-described range include the same methods as the above-described method for adjusting the equivalent circle diameter of the island-shaped region, the same methods as the above-described method for adjusting the area ratio of the island-shaped region, and a method of a combination of these methods.

[Other Components]

The polymer film according to the embodiment of the present invention may include a component other than the above. Examples of such other components include a cross-linking component, a compatible component, a plasticizer, a stabilizer, a lubricant, and a colorant.

(Cross-Linking Component)

Examples of the cross-linking component include compounds having a reactive group, such as an epoxy group-containing ethylene copolymer (for example, an ethylene-glycidyl methacrylate copolymer, an ethylene-vinyl acetate-glycidyl methacrylate copolymer, an ethylene-methyl acrylate-glycidyl methacrylate copolymer, and poly(ethylene-glycidyl methacrylate)-graft-poly(acrylonitrile-styrene)), a bisphenol-type epoxy compound, and a carbodiimide compound.

A content of the cross-linking component is preferably 0% to 50% by mass with respect to the total mass of the polymer film.

(Compatible Component)

Examples of the compatible component include oxazoline-based compatibilizers (for example, a bisoxazoline-styrene-maleic acid anhydride copolymer, a bisoxazoline-maleic acid anhydride-modified polyethylene, and a bisoxazoline-maleic acid anhydride-modified polypropylene); elastomer-based compatibilizers (for example, a styrene-ethylene-butadiene copolymer, a styrene-ethylene-butadiene-styrene copolymer, a hydrogenated styrene-isopropylene-styrene copolymer, an aromatic resin, and a petroleum resin); reactive compatibilizers (for example, an ethylene glycidyl methacrylate copolymer, an ethylene maleic acid anhydride ethyl acrylate copolymer, ethylene glycidyl methacrylate-acrylonitrile styrene, acid-modified polyethylene wax, a COOH-modified polyethylene graft polymer, and a COOH-modified polypropylene graft polymer); and copolymer-based compatibilizers (for example, a polyethylene-polyamide graft copolymer, a polypropylene-polyamide graft copolymer, a methyl methacrylate-butadiene-styrene resin, acrylonitrile-butadiene rubber, a EVA-PVC-graft copolymer, a vinyl acetate-ethylene copolymer resin, an ethylene-α-olefin copolymer, a propylene-α-olefin copolymer, and a hydrogenated styrene-isopropylene-block copolymer).

In addition, as the compatible component, ionomer resins such as an ethylene-methacrylic acid copolymer ionomer, an ethylene-acrylic acid copolymer ionomer, a propylene-methacrylic acid copolymer ionomer, a butylene-acrylic acid copolymer ionomer, a propylene-acrylic acid copolymer ionomer, an ethylene-vinyl sulfonic acid copolymer ionomer, a styrene-methacrylic acid copolymer ionomer, a sulfonized polystyrene ionomer, a fluorine-based ionomer, a telekeric polybutadiene acrylic acid ionomer, a sulfated ethylene-propylene-diene copolymer ionomer, hydrogenated polypentamer ionomer, a polypentamer ionomer, a poly(vinyl pyridium salt) ionomer, a poly(vinyltrimethylammonium salt) ionomer, a poly(vinyl benzyl phosphonium salt) ionomer, a styrene-butadiene acrylic acid copolymer ionomer, a polyurethane ionomer, a sulfated styrene-2-acrylamide-2-methyl propane sulfate ionomer, am acid-amine Ionomer, an aliphatic ionene, and an aromatic ionene may be used.

A content of the compatible component is preferably 0% to 50% by mass with respect to the total mass of the polymer film.

However, in a case where the compatible component also corresponds to the component A, the compatible component is classified into the component A.

(Plasticizer, Stabilizer, Lubricant, and Organic Fine Particles)

Examples of the plasticizer include alkylphthalylalkyl glycolates, phosphoric acid esters, carboxylic acid esters, and polyhydric alcohols. A content of the plasticizer is preferably 0% to 20% by mass with respect to the total mass of the polymer film.

Examples of the stabilizer include phosphite-based stabilizers (for example, tris(4-methoxy-3,5-diphenyl) phosphite, tris(nonylphenyl) phosphite, and tris(2,4-di-t-butylphenyl) phosphite), phenol-based stabilizers (for example, 2,6-di-t-butyl-4-methylphenol, 2,2-methylenebis(4-ethyl-6-t-butylphenol), 2,5-di-t-butylhydroquinone, pentaerythritol tetrakis[3-(3,5-di-t-butyl-4-hydroxyphenyl)propiolate], 4,4-thiobis-(6-t-butyl-3-methylphenol), 1,1-bis(4-hydroxyphenyl)cyclohexane, and octadecyl-3-(3,5-di-t-butyl-4-hydroxyphenyl)propiolate), epoxy compounds, and thioether compounds. A content of the stabilizer is preferably 0% to 10% by mass.

Examples of the lubricant include fatty acid esters and metal soaps (for example, a stearic acid inorganic salt). A content of the lubricant is preferably 0% to 5% by mass with respect to the total mass of the polymer film.

Examples of the organic fine particles include organic fine particles such as crosslinked acrylic and crosslinked styrene. A content of the organic fine particles is preferably 0% to 50% by mass with respect to the total mass of the polymer film.

[Physical Properties and the Like of Polymer Film]

A proportion of a Young's modulus in the second direction in a plane of the polymer film orthogonal to the first direction to a Young's modulus in the first direction in the plane of the polymer film is preferably 0.5 to 1.9, more preferably 0.5 to 1.5, still more preferably 0.7 to 1.3, and particularly preferably 0.8 to 1.2.

A method for measuring the Young's modulus is as shown in Example column described later.

A proportion of a dielectric loss tangent in the second direction in a plane of the polymer film orthogonal to the first direction to a dielectric loss tangent in the first direction in the plane of the polymer film is preferably 0.5 to 1.5, more preferably 0.7 to 1.3, and particularly preferably 0.8 to 1.2.

A method for measuring the dielectric loss tangent is as shown in Example column described later.

A proportion of a dielectric constant in the second direction in a plane of the polymer film orthogonal to the first direction to a dielectric constant in the first direction in the plane of the polymer film is preferably 0.5 to 1.5, more preferably 0.8 to 1.2, and particularly preferably 0.9 to 1.1.

A method for measuring the dielectric constant is as shown in Example column described later.

An arithmetic average surface roughness Ra of the surface of the polymer film is preferably 400 nm or less, more preferably 300 nm or less, and particularly preferably 200 nm or less.

The lower limit value of the arithmetic average surface roughness Ra of the surface of the polymer film is not particularly limited, but is usually 10 nm or more.

A method for measuring the arithmetic average roughness Ra is as shown in Example column described later.

A thickness of the polymer film is preferably 5 to 1100 μm, more preferably 5 to 1000 μm, still more preferably 5 to 250 μm, and particularly preferably 5 to 150 μm.

A method for measuring the thickness of the polymer film is as shown in Example column described later.

[Manufacturing Method of Polymer Film]

A manufacturing method of the polymer film according to the embodiment of the present invention is not particularly limited, but for example, preferably includes a pelleting step of kneading each of the above-described components to obtain pellets, and a film forming step of obtaining the polymer film using the pellets. In the following, the polymer film according to the embodiment of the present invention may be simply referred to as a "film". Each step will be described below.

[Pelleting Step]

(Pelletization)

(1) Raw Material Form

As the liquid crystal polymer used for the film formation, pellet-shaped, flake-shaped or powder-shaped ones can be used as they are, but for the purpose of stabilizing the film formation and uniformly dispersing an additive (meaning a component other than the liquid crystal polymer; the same applies hereinafter), it is preferable that one or more kinds of raw materials (meaning at least one of a liquid crystal polymer or an additive; the same applies hereinafter) are kneaded using an extruder and pelletized before use.

(2) Drying or Drying Alternative by Vent

Before pelletizing, it is preferable to dry the liquid crystal polymer and the additive in advance. As a drying method, it is possible to circulate heated air having a low dew point or to dehumidify by vacuum drying. In particular, in a case of a resin which is easily oxidized, vacuum drying or drying using an inert gas is preferable.

In addition, the drying can be substituted with a method of using a vent type extruder. The vent type extruder is available in monoaxial type and biaxial type, both of which can be used, but the biaxial type is more efficient and preferable. The inside of the extruder is pelletized by a vent at less than 1 atm, more preferably 0 to 0.8 atm and still more preferably 0 to 0.6 atm. Such depressurization can be achieved by exhausting air from a vent or hopper provided in a kneading portion of the extruder using a vacuum pump.

(3) Raw Material Supply Method

A raw material supply method may be a method in which raw materials are mixed in advance before being made into kneaded pellets and then supplied, a method in which raw materials are separately supplied into the extruder so as to be in a fixed ratio, or a method of a combination of both.

(4) Type of Extruder

The pelletization can be produced by melting and uniformly dispersing the liquid crystal polymer and/or additive with an extruder, cooling and solidifying, and then cutting. As the extruder, as long as a sufficient melt-kneading effect can be obtained, known monoaxial screw extruders, non-meshing different-direction rotating biaxial screw extruders, meshing different-direction rotating biaxial screw extruders, meshing co-rotating biaxial screw extruders, and the like can be used.

(5) Atmosphere During Extrusion

In a case of melt extrusion, to the extent that uniform dispersion is not hindered, it is preferable to prevent thermal and oxidative deterioration as much as possible, and it is also effective to reduce an oxygen concentration by reducing the pressure using a vacuum pump or inflowing an inert gas. These methods may be carried out alone or in combination.

(6) Rotation Speed

A rotation speed of the extruder is preferably 10 to 1000 rpm, more preferably 20 to 700 rpm, and particularly preferably 30 to 500 rpm. In a case where the rotation rate is set to the lower limit value or more, a retention time can be shortened, so that it is possible to suppress a decrease in molecular weight due to thermal deterioration and a remarkable coloration of the resin due to thermal deterioration. In addition, in a case where the rotation rate is set to the upper limit value or less, a breakage of a molecular chain due to shearing can be suppressed, so that it is possible to suppress a decrease in molecular weight and an increase in generation of crosslinked gel. It is preferable to select appropriate conditions for the rotation speed from the viewpoints of both uniform dispersibility and thermal deterioration due to extension of the retention time.

(7) Temperature

A kneading temperature is preferably set to be equal to or lower than a thermal decomposition temperature of the resin and the additive, and is preferably set to a low temperature as much as possible within a range in which a load of the extruder and a decrease in uniform kneading property are not a problem. However, in a case where the temperature is too low, the melt viscosity may increase, and conversely, a shear stress during kneading may increase, causing molecular chain breakage. Therefore, it is necessary to select an appropriate range. In addition, in order to achieve both improved dispersibility and thermal deterioration, it is also effective to melt and mix a first half part in the extruder at a relatively high temperature and lower the resin temperature in a second half part.

(8) Pressure

A kneading resin pressure during pelletization is preferably 0.05 to 30 MPa. In a case of a resin in which coloration or gel is likely to be generated due to shearing, it is preferable to apply an internal pressure of approximately 1 to 10 MPa to the inside of the extruder to fill the inside of the biaxial screw extruder with the resin raw material. As a result, the kneading can be performed more efficiently with low shear, so that uniform dispersion is promoted while suppressing thermal decomposition. An adjustment of such a pressure can be performed by adjusting Q/N (discharge amount per one rotation of screw) or by providing a pressure adjusting valve at the outlet of the biaxial screw kneading extruder.

(9) Shear and Screw Type

In order to uniformly disperse a plurality of types of raw materials, it is preferable to apply shear, but in a case where the shear is applied more than necessary, molecular chain breakage or gel generation may occur. Therefore, it is preferable to appropriately select a rotor segment, the number of kneading discs, or a clearance to be disposed on the screw. In general, since the rotor segment has large clearance, the rotor segment tends to have lower shear than the kneading disc type.

A shear rate in the extruder (shear rate during pelletization) is preferably 60 to 1000 sec$^{-1}$, more preferably 100 to 800 sec$^{-1}$, and particularly preferably 200 to 500 sec$^{-1}$. In a case where the shear rate is set to the lower limit value or more, it is possible to suppress occurrence of melting defects of raw materials and occurrence of dispersion defects of additives. In a case where the shear rate is set to the upper limit value or less, a breakage of a molecular chain can be suppressed, and it is possible to suppress a decrease in molecular weight and an increase in generation of crosslinked gel. In addition, in a case where the shear rate during pelletization is within the above-described range, it is easy to adjust an equivalent circle diameter of the above-described island-shaped region to the above-described range.

(10) Retention Time

A retention time of the extruder can be calculated from a volume of a resin retention portion in the extruder and a discharge capacity of the polymer. An extrusion retention time in the pelletization is preferably 10 seconds to 30 minutes, more preferably 15 seconds to 10 minutes, and particularly preferably 30 seconds to 3 minutes. Deterioration of the resin and discoloration of the resin can be suppressed as long as sufficient melting can be ensured, so that it is preferable that the retention time is short.

(11) Pelletizing Method

As a pelletizing method, a method of solidifying a noodle-shaped extrusion and then cutting the extrusion is generally used, but the pelletization may be performed by an under water cut method for cutting while directly extruding from a mouthpiece into water after melting with the extruder, or a hot cut method for cutting while still hot.

(12) Pellet Size

A pellet size is preferably 1 to 300 mm$^2$ in a cross-sectional area and 1 to 30 mm in a length, and particularly preferably 2 to 100 mm$^2$ in a cross-sectional area and 1.5 to 10 mm in a length.

(13) Other Pelletizing Method 1 (Solution Method)

As a general pelletizing method, the above-described melt-kneading method using an extruder is generally used, but a method of producing a uniformly dispersed solution of the liquid crystal polymer and the additive with a common solvent, and removing the solvent can also be used.

Examples of such a solvent include methyl alcohol, ethyl alcohol, acetone, methyl ethyl ketone, diethyl ether, ethyl acetate, butyl acetate, and dichloromethane.

From the viewpoint of efficiency and dispersibility, a concentration after the dissolution is preferably 1% to 50% by mass, more preferably 3% to 35% by mass, and particularly preferably 5% to 30% by mass.

Solidification may be performed by drying the solvent after the dissolution (drying method), or may be performed by putting a poor solvent into the solution after the dissolution to be precipitated (precipitation method).

(Drying)

(1) Purpose of Drying

Before a melt film formation, it is preferable to reduce water content or volatile matter content in the pellets, and it is effective to dry the pellets. In a case where the pellets include water or volatile matter, not only appearance is deteriorated due to inclusion of bubbles in the film-forming film or decrease in haze, but also physical properties may be deteriorated due to a molecular chain breakage of the liquid crystal polymer, or roll contamination may occur due to generation of monomers or oligomers. In addition, depending on the type of the liquid crystal polymer used, it may be possible to suppress formation of an oxidative crosslinked substance during melt film formation by removing dissolved oxygen by the drying.

(2) Drying Method and Heating Method

As a drying method, from the viewpoints of drying efficiency or economical efficiency, a dehumidifying hot air dryer is generally used, but the drying method is not particularly limited as long as a desired moisture content can be obtained. In addition, there is no problem in selecting a more appropriate method according to characteristics of the physical properties of the liquid crystal polymer.

Examples of a heating method include pressurized steam, heater heating, far-infrared irradiation, microwave heating, and a heat medium circulation heating method.

In order to use energy more effectively and to reduce temperature unevenness so as to perform uniform drying, it is preferable to provide a heat insulating structure in a drying equipment.

It is possible to perform stirring in order to improve drying efficiency, but pellet powder may be generated, so that the stirring may be performed properly. In addition, the drying method is not limited to one type, and a plurality of types can be combined and efficiently performed.

(3) Form of Device

The drying method has two types, a continuous method and a batch method, and in a drying method using vacuum, the batch method is preferable, while the continuous method has the advantage of excellent uniformity in a steady state, and it is necessary to use the methods depending on the application.

(4) Atmosphere and Air Volume

As for a dry atmosphere, a method of blowing or depressurizing air having a low dew point or inert gas having a low dew point is used. The dew point of the air is preferably 0° C. to −60° C., more preferably 10° C. to −55° C., and particularly preferably −20° C. to −50° C. Setting a low dew point atmosphere is preferable from the viewpoint of reducing the volatile matter content contained in the pellets, but is disadvantageous from the viewpoint of economical efficiency, and an appropriate range may be selected. In a case where the raw material is damaged by oxygen, it is also effective to use an inert gas to reduce oxygen partial pressure.

An air volume required per one ton of the liquid crystal polymer is preferably 20 to 2000 m$^3$/hour, more preferably 50 to 1000 m$^3$/hour, and particularly preferably 100 to 500 m$^3$/hour. In a case where the drying air volume is the lower limit value or more, the drying efficiency is improved. In a case where the drying air volume is the upper limit value or less, it is economically preferred.

(5) Temperature and Time

In a case where the raw material is in an amorphous state, a drying temperature is preferably {Glass transition temperature (Tg) (° C.)−1° C.} to {Tg (° C.)−100° C.} (that is, a temperature 1° C. to 100° C. lower than Tg), more preferably {Tg (° C.)−5° C.} to {Tg (° C.)−60° C.}, and particularly preferably {Tg (° C.)−10° C.} to {Tg (° C.)−40° C.}.

In a case where the drying temperature is the upper limit value or less, blocking due to softening of the resin can be suppressed, so that transportability is excellent. On the other hand, in a case where the drying temperature is the lower limit value or more, the drying efficiency can be improved, and the moisture content can be set to a desired value.

In addition, in a case of a crystalline resin, the resin can be dried without melting in a case of {Melting point (Tm) (° C.)–30° C.} or lower. Excessive temperatures may result in coloration or change in molecular weight (generally decreased, but in some cases, increased). In addition, since the drying efficiency is low even in a case where the temperature is too low, it is necessary to select appropriate conditions. As a guide, {Tm (° C.)–150° C.} to {Tm (° C.)–50° C.} is preferable.

A drying time is preferably 15 minutes or more, more preferably 1 hour or more, and particularly preferably 2 hours or more. Even in a case of being dried for more than 50 hours, an effect of further reducing the water content is small and there is a concern about thermal deterioration of the resin, so that it is not necessary to lengthen the drying time unnecessarily.

(6) Moisture Content

A moisture content of the pellets is preferably 1.0% by mass or less, more preferably 0.1% by mass or less, and particularly preferably 0.01% by mass or less.

(7) Transportation Method

In order to prevent water re-adsorption to the dried pellets, it is preferable to use dry air or nitrogen for transporting the pellets. In addition, in order to stabilize the extrusion, it is also effective to supply high temperature pellets at a constant temperature to the extruder, and it is also common to use heated dry air to maintain the heated state.

[Film Formation Step]

(Manufacturing Device)

Hereinafter, an example of each equipment constituting the manufacturing device will be described.

(Extruder, Screw, and Barrel)

(1) Extruder Structure

The liquid crystal polymer raw materials (pellets) are supplied into a cylinder through a supply port of the extruder. The inside of the cylinder is composed of a supply unit for quantitatively transporting the supplied liquid crystal polymers in order from the supply port side, a compression unit for melt-kneading and compressing the liquid crystal polymers, and a measuring unit for measuring the melt-kneaded and compressed liquid crystal polymers. A heating and cooling device divided into a plurality of parts is provided on an outer peripheral portion of the cylinder, so that each zone in the cylinder can be controlled to a desired temperature. A band heater or a sheathed wire aluminum cast heater is usually used for heating the cylinder, but a heat medium circulation heating method can also be used. In addition, although air cooling with a blower is generally used for cooling, there is also a method of flowing water or oil through a pipe wound around the outer circumference of the cylinder.

Further, it is preferable to cool the supply port portion in order to prevent the pellets from being heated and fused and to prevent heat transfer for protecting a screw drive equipment.

It is necessary to use a material for an inner wall surface of the cylinder, which has excellent heat resistance, abrasion resistance, and corrosion resistance and can secure friction with the resin. Generally, nitriding steel in which an inner surface is nitrided is used, but chrome molybdenum steel, nickel chrome molybdenum steel, and stainless steel can also be nitrided and used.

Especially for applications where abrasion resistance and corrosion resistance are required, it is effective to use a bimetallic cylinder with a corrosion-resistant and abrasion-resistant material alloy, such as nickel, cobalt, chrome, and tungsten, lined on the inner wall surface of the cylinder by centrifugal casting, and form a ceramic sprayed coating.

In addition, although the cylinder usually has a smooth inner surface, an axial groove (square groove, semicircular groove, helical groove, and the like) may be provided on an interior wall of the cylinder for the purpose of increasing the extrusion amount. However, since the groove in the cylinder causes polymer retention in the extruder, it is necessary to be careful in a case of using the cylinder having a groove in applications where foreign matter levels are strict.

(2) Type of Extruder

Generally used extruders are roughly classified into monoaxial (single-screw) and biaxial type, and monoaxial extruders are widely used. Biaxial (multiaxial) screws are roughly classified into meshing type and non-meshing type, and rotation directions are also divided into the same direction and different directions. The meshing type has a higher kneading effect than the non-meshing type, and is often used. In addition, the different-direction rotating screw has a higher kneading effect than the co-rotating type, but the co-rotating type has a self-cleaning effect, and thus is effective in preventing retention in the extruder. Furthermore, there are parallel and oblique crossing in the axial direction, and there is also a conical type shape used in a case of applying strong shear. In the biaxial extruder, by properly disposing a vent port, undried raw materials (pellets, powder, and flakes), selvage of a film, produced during film formation, and the like can be used as they are, so the biaxial extruder is widely used. However, even in a case of the monoaxial extruder, it is possible to remove volatile components by properly disposing a vent port. It is important to select the extruder used for film formation according to the required extrusion performance (extrusion stability, kneading property, retention prevention, heat history) and the characteristics of the extruder.

In the extruder, it is common to use monoaxial and biaxial (multiaxial) individually, but it is also common to use them in combination by taking advantage of their respective characteristics. For example, a combination of a biaxial extruder which can use an undried raw material and a monoaxial extruder having good meterability is widely used for forming a film of polyester (PET) resin.

(3) Screw Type and Structure

Here, an example of a screw for a monoaxial extruder is shown. As a shape of the screw generally used, a full flight screw provided with a single spiral flight of equal pitch is often used, but a double flight screw capable of stabilizing extrudability by separating a solid-liquid phase of the resin in the melting process by using two flights is often used. Further, in order to improve kneading property in the extruder, it is common to combine mixing elements such as Maddock, Dulmage, and a barrier. Furthermore, in order to enhance the kneading effect, a screw having a polygonal cross section, or a screw having a distribution hole for imparting a distribution function in order to reduce temperature unevenness in the extruder is also used.

As a material used for the screw, it is necessary to use a material having excellent heat resistance, abrasion resistance, and corrosion resistance and capable of ensuring friction with the resin, as in the case of the cylinder. General examples thereof include nitrided steel, chrome molybdenum steel, nickel chrome molybdenum steel, and stainless steel. Generally, a screw is manufactured by grinding the above-described steel material and performing nitriding treatment and/or plating treatment such as HCr, but a screw surface may be subjected to special surface treatment such as TiN, CrN, or Ti coating by physical vapor deposition (PVD) or chemical vapor deposition (CVD).

Diameter and Groove Depth

A preferred screw diameter varies depending on the target extrusion amount per unit time, but is preferably 10 to 300 mm, more preferably 20 to 250 mm, and particularly preferably 30 to 150 mm. A groove depth of a screw feed portion is preferably 0.05 to 0.20 times, more preferably 0.07 to 0.18 times, and particularly preferably 0.08 to 0.17 times the screw diameter. A flight pitch is generally the same as the screw diameter, but a shorter one may be used to increase the uniformity of melting, or a longer one may be used to increase the extrusion rate. In addition, a flight groove width is preferably 0.05 to 0.25 of the screw flight pitch, and generally approximately 0.1 is often used from the viewpoint of friction between the screw and the barrel and reduction of the retention portion. A clearance between the flight and the barrel is also 0.001 to 0.005 times the screw diameter, but 0.0015 to 0.004 times is preferable from the viewpoint of friction between the barrels and reduction of the retention portion.

Compression Rate

In addition, a screw compression ratio of the extruder is preferably 1.6 to 4.5. Here, the screw compression ratio is expressed as a volume ratio between the supply unit and the measuring unit, that is, (Volume per unit length of supply unit)±(Volume per unit length of measuring unit), and is calculated from using the outer diameter of the screw shaft of the supply unit, the outer diameter of the screw shaft of the measuring unit, the groove diameter of the supply unit, and the groove diameter of the measuring unit. In a case where the screw compression ratio is 1.6 or more, sufficient melt-kneading property can be obtained, the generation of undissolved portions can be suppressed, undissolved foreign matters are less likely to remain on the thermoplastic film after manufacturing, and the mixing of air bubbles can be suppressed by the defoaming effect. On the contrary, in a case where the screw compression ratio is 4.5 or less, it is possible to prevent excessive shear stress from being applied. Specifically, it is possible to suppress a decrease in the mechanical strength of the film due to molecular chain breakage, a superheat coloring phenomenon due to shear heat generation, and a decrease in foreign matter level due to gel generation. Therefore, the appropriate screw compression ratio is preferably 1.6 to 4.5, more preferably 1.7 to 4.2, and particularly preferably 1.8 to 4.0.

L/D

L/D is a ratio of the cylinder length to the cylinder inner diameter. In a case where the L/D is 20 or more, melting and kneading are sufficient, and the generation of undissolved foreign matter in the thermoplastic film after manufacturing can be suppressed as in the case where the compression ratio is appropriate. In addition, in a case where the L/D is 70 or less, the retention time of the liquid crystal polymer in the extruder is shortened, so that the deterioration of the resin can be suppressed. Further, in a case where the retention time can be shortened, the decrease in the mechanical strength of the thermoplastic film caused by the decrease in the molecular weight due to the breakage of the molecular chain can be suppressed. Therefore, the L/D is preferably in a range of 20 to 70, more preferably in a range of 22 to 65, and particularly preferably in a range of 24 to 50.

Screw Proportion

A length of the extruder supply unit is preferably 20% to 60%, more preferably 30% to 50% of an effective screw length (total length of the supply unit, compression unit, and measuring unit). A length of the extruder compression unit is preferably 5% to 50% of the effective screw length, is preferably 5% to 40% in a case of a crystalline resin, and preferably 10% to 50% in a case of an amorphous resin. The measuring unit preferably has a 20% to 60% length of the effective screw length, and more preferably 30% to 50% length. It is also common practice to divide the measuring portion into a plurality of parts and arrange a mixing element between them to improve the kneading property.

Q/N

A discharge amount (Q/N) of the extruder is preferably 50% to 99%, more preferably 60% to 95%, and particularly preferably 70% to 90% of a theoretical maximum discharge amount $(Q/N)_{MAX}$. Q indicates a discharge amount [cm$^3$/min], N indicates a screw rotation speed [rpm], and (Q/N) indicates a discharge amount per screw rotation. In a case where the discharge amount (Q/N) is 50% or more of the theoretical maximum discharge amount $(Q/N)_{MAX}$, the retention time in the extruder can be shortened and the progress of thermal deterioration inside the extruder can be suppressed. In addition, in a case of being 99% or less, a back pressure is sufficient, so that the kneading property is improved, the melting uniformity is improved, and the stability of the extrusion pressure is also good.

It is preferable to select the optimum screw dimension in consideration of the crystallinity of the resin, the melt viscous property, the heat stability, the extrusion stability, and the uniformity of the melt plasticization.

(4) Extrusion Conditions

Drying of Raw Materials

In the melt plasticization step of pellets using the extruder, as in the pelleting step, it is preferable to reduce water content or volatile matter content in the pellets, and it is effective to dry the pellets.

Raw Material Supply Method

In a case where there are multiple types of raw materials (pellets) input from the extruder supply port, the raw materials may be mixed in advance (premix method), may be separately supplied into the extruder in a fixed proportion, or may be a combination of both. In addition, in order to stabilize the extrusion, it is generally practiced to reduce the fluctuation of the temperature or the bulk specific density of the raw material charged from the supply port. Further, from the viewpoint of thermoplastic efficiency, a raw material temperature is preferably high as long as it does not adhere to the supply port and block, and in a case where the raw material is in an amorphous state, the raw material temperature is preferably {Glass transition temperature (Tg) (° C.)–150° C.} to {Tg (° C.)–1° C.}, and in a case where the raw material is a crystalline resin, the raw material temperature is preferably {Melting point (Tm) (° C.)–150° C.} to {Tm (° C.)–1° C.}, and the raw material is heated or kept warm. Further, from the viewpoint of thermoplastic efficiency, the bulk specific gravity of the raw material is preferably 0.3 times or more, and particularly preferably 0.4 times or more in a case of a molten state. In a case where the bulk specific density of the raw material is less than 0.3 times the specific gravity in the molten state, a processing treatment such as compressing the raw material into pseudo-pellets is performed.

Atmosphere During Extrusion

As for the atmosphere during melt extrusion, it is necessary to prevent heat and oxidative deterioration as much as possible within the range that does not hinder uniform dispersion as in the pelleting step. It is also effective to inject an inert gas (nitrogen or the like), reduce the oxygen concentration in the extruder by using a vacuum hopper, and provide a vent port in the extruder to reduce the pressure by a vacuum pump. These depressurization and injection of the inert gas may be carried out independently or in combination.

Rotation Speed

A rotation speed of the extruder is preferably 5 to 300 rpm, more preferably 10 to 200 rpm, and particularly preferably 15 to 100 rpm. In a case where the rotation rate is set to the lower limit value or more, the retention time is shortened, the decrease in molecular weight can be suppressed due to thermal deterioration, and discoloration can be suppressed. In a case where the rotation rate is set to the upper limit value or less, a breakage of a molecular chain due to shearing can be suppressed, and it is possible to suppress a decrease in molecular weight or an increase in generation of crosslinked gel. It is preferable to select appropriate conditions for the rotation speed from the viewpoints of both uniform dispersibility and thermal deterioration due to extension of the retention time.

Temperature

A barrel temperature (supply unit temperature $T_1°$ C., compression unit temperature $T_2°$ C., and measuring unit temperature $T_3°$ C.) is generally determined by the following method. In a case where the pellets are melt-plasticized at a target temperature T° C. by the extruder, the measuring unit temperature $T_3$ is set to T±20° C. in consideration of the shear calorific value. In this case, $T_2$ is set within a range of $T_3$±20° C. in consideration of extrusion stability and thermal decomposability of the resin. Generally, $T_1$ is set to $\{T_2$ (° C.)-5° C.$\}$ to $\{T_2$ (° C.)-150° C.$\}$, and the optimum value of $T_1$ is selected from the viewpoint of ensuring friction between the resin and the barrel, which is the driving force (feed force) for feeding the resin, and preheating at the feed portion. In a case of a normal extruder, it is possible to subdivide each zone of $T_1$ to $T_3$ and set the temperature, and by setting such that the temperature change between each zone is gentle, it is possible to make it more stable. In this case, T is preferably set to be equal to or lower than the thermal deterioration temperature of the resin, and in a case where the thermal deterioration temperature is exceeded due to the shear heat generation of the extruder, it is generally performed to positively cool and remove the shear heat generation. In addition, in order to achieve both improved dispersibility and thermal deterioration, it is also effective to melt and mix a first half part in the extruder at a relatively high temperature and lower the resin temperature in a second half part.

Screw Temperature Control

Controlling the temperature of the screw is also performed to stabilize the extrusion. As a temperature control method, it is common to flow water or a medium inside the screw, and in some cases, a heater may be built the inside of the screw to heat the screw. The temperature range is generally controlled in the screw supply unit, but in some cases, the compression unit or the measuring unit may also be controlled, and the temperature may be controlled to a different temperature in each zone.

Pressure

A resin pressure in the extruder is generally 1 to 50 MPa, and from the viewpoint of extrusion stability and melt uniformity, preferably 2 to 30 MPa and particularly preferably 3 to 20 MPa. In a case where the pressure in the extruder is 1 MPa or more, the filling rate of the melting in the extruder is sufficient, so that the destabilization of the extrusion pressure or the generation of foreign matter due to the generation of retention portions can be suppressed. In addition, in a case where the pressure in the extruder is 50 MPa or less, it is possible to suppress the excessive shear stress received in the extruder, so that thermal decomposition due to an increase in the resin temperature can be suppressed.

Retention Time

The retention time in the extruder (retention time during film formation) can be calculated from the volume of the extruder portion and the discharge capacity of the polymer, as in the pelleting step. The retention time is preferably 10 seconds to 30 minutes, more preferably 15 seconds to 15 minutes, and most preferably 30 seconds to 10 minutes. In a case where the retention time is 10 seconds or more, the melt plasticization and the dispersion of the additive are sufficient. In a case where the retention time is 30 minutes or less, it is preferable in that resin deterioration and discoloration of the resin can be suppressed.

(Filtration (Screen Changer))

Type, Installation Purpose, and Structure

It is generally used to provide a filtration equipment at the outlet of the extruder in order to prevent damage to the gear pump due to foreign matter included in the raw material and to extend the life of the filter having a fine pore size installed downstream of the extruder. It is preferable to perform so-called breaker plate type filtration in which a mesh-shaped filtering medium is used in combination with a reinforcing plate having a high opening ratio and having strength.

Mesh Size and Filtration Area

A mesh size is preferably 40 to 800 mesh, more preferably 60 to 700 mesh, and particularly preferably 100 to 600 mesh. In a case where the mesh size is 40 mesh or more, it is possible to sufficiently suppress foreign matter from passing through the mesh. In addition, in a case where the mesh is 800 mesh or less, the improvement of the filtration pressure increase speed can be suppressed and the mesh replacement frequency can be reduced. Further, from the viewpoint of filtration accuracy and strength maintenance, it is generally used to superimpose a plurality of types of filter meshes having different mesh sizes. Further, since the filtration opening area can be widened and the strength of the mesh can be maintained, it is also used to reinforce the filter mesh by using a breaker plate. An opening ratio of the breaker plate used is generally 30% to 80% from the viewpoints of filtration efficiency and strength.

In addition, a screen changer is often used with the same diameter as the barrel diameter of the extruder, but in order to increase the filtration area, it is also commonly used to use a larger diameter filter mesh using a tapered pipe, or to use a plurality of breaker plates by branching a flow channel. The filtration area is preferably selected with a flow rate of 0.05 to 5 $g/cm^2$ per second as a guide, more preferably 0.1 to 3 $g/cm^2$, and particularly preferably 0.2 to 2 $g/cm^2$.

By capturing foreign matter, the filter is clogged and the filter pressure rises. In that case, it is necessary to stop the extruder and replace the filter, but a type in which the filter can be replaced while continuing extrusion can also be used. In addition, as a measure against an increase in the filtration pressure due to the capture of foreign matter, a substance having a function of lowering the filtration pressure by cleaning and removing the foreign matter trapped in the filter by reversing the flow channel of the polymer can also be used.

(Microfiltration)

Type, Installation Purpose, and Structure

In order to perform foreign matter filtration with higher accuracy, it is preferable to provide a precision filter device with high filtration accuracy before extrusion from the die. It is preferable that the filtration accuracy of the filtering medium of the filter is high, but from the pressure resistance of the filtering medium and the suppression of the increase in the filter pressure due to clogging of the filtering medium, the filtration accuracy is preferably 3 µm to 30 µm, more preferably 3 µm to 20 µm, and particularly preferably 3 µm to 10 µm. The microfiltration device is usually provided at one place, but multi-stage filtration performed at a plurality of places in series and/or in parallel may be performed. Since the filter to be used has a large filtration area and high pressure resistance, it is preferable to provide a filtration device incorporating a leaf type disc filter. The leaf type disc filter can adjust the number of loaded sheets in order to secure the withstand voltage and the suitability of the filter life.

The required filtration area varies depending on the melt viscosity of the resin to be filtered, but is preferably 5 to 100 $g \cdot cm^{-2} \cdot h^{-1}$, more preferably 10 to 75 $g \cdot cm^{-2} \cdot h^{-1}$, and particularly preferably 15 to 50 $g \cdot cm^{-2} \cdot h^{-1}$. Increasing the filtration area is advantageous from the viewpoint of increasing the filter pressure, but it increases the retention time inside the filter and causes the generation of deteriorated foreign matter, so it is necessary to select appropriate conditions.

As a type of the filtering medium, it is preferable to use a steel material from the viewpoint of being used under high temperature and high pressure, and it is more preferable to use stainless steel or steel among the steel materials, and it is particularly preferable to use stainless steel from the viewpoint of corrosion.

As a configuration of the filtering medium, in addition to the knitted wire rod, for example, a sintered filtering medium formed by sintering metal filaments or metal powder is also used. In addition, it is common to use a filter with a single diameter wire, but in order to improve the filter life or filtration accuracy, those having different wire diameters in the thickness direction of the filter may be laminated, or a filtering medium having a continuously changing wire diameter may be used.

In addition, a thickness of the filter is preferably thick from the viewpoint of filtration accuracy, while it is preferably thin from the viewpoint of increasing the filter pressure. Therefore, the thickness of the filter is preferably 200 µm to 3 mm, more preferably 300 µm to 2 mm, and particularly preferably 400 µm to 1.5 mm as a range in which compatibility conditions are possible.

A filter porosity is preferably 50% or more and particularly preferably 70% or more. In a case of being 50% or more, the pressure loss is low and the clogging is small, so that the operation can be performed for a long time. The filter porosity is preferably 90% or less. In a case of being 90% or less, it is possible to suppress the filtering medium from being crushed in a case where the filter pressure rises, so that the rise in the filter pressure can be suppressed.

It is preferable to appropriately select the filtration accuracy of the filtering medium, the wire diameter of the filtering medium, the porosity of the filtering medium, and the thickness of the filtering medium according to the melt viscosity of the resin to be filtered and the filtration flow rate.
(Connection Pipe and the Like)

It is necessary that pipes (adapter pipe, switching valve, and mixing device) which connect each part of a film forming apparatus have excellent corrosion resistance and heat resistance, similar to the barrel or screw of the extruder, and usually, chrome molybdenum steel, nickel chrome molybdenum steel, or stainless steel is used. In addition, in order to improve the corrosion resistance, a surface of a polymer flow channel is plated with HCr, Ni, or the like.

Further, in order to prevent retention inside the pipe, the surface roughness inside the pipe is preferably Ra=200 nm or less, and more preferably Ra=150 nm or less.

Further, it is preferable that the pipe diameter is large from the viewpoint of reducing pressure loss, but on the other hand, retention is likely to occur due to a decrease in the flow velocity of the pipe portion. Therefore, it is necessary to select an appropriate pipe diameter, but 5 to 200 $Kg \cdot cm^{-2} \cdot h^{-1}$ is preferable, 10 to 150 $Kg \cdot cm^{-2} \cdot h^{-1}$ is more preferable, and 15 to 100 $Kg \cdot cm^{-2} \cdot h^{-1}$ is particularly preferable.

In order to stabilize the extrusion pressure of the liquid crystal polymer having a high temperature dependence of the melt viscosity, it is preferable to minimize the temperature fluctuation of the piping portion as well. Generally, a band heater having a low equipment cost is often used for heating the pipe, but an aluminum cast heater having a small temperature fluctuation or a method using a heat medium circulation is more preferable. In addition, it is preferable to divide the pipe into a plurality of pipes as in the case of the cylinder barrel and control each zone individually from the viewpoint of reducing temperature unevenness. Further, as for temperature control, proportional-integral-differential (PID) controller is generally used, and it is more preferable to use a combination of a method of variably controlling the heater output by using an AC power regulator.

Further, for uniformizing the film, it is also effective to make the resin temperature and the resin composition uniform by installing a mixing device in the flow channel of the extruder. As the mixing device, it is effective to use a spiral type or stator type static mixer, and the spiral type static mixer is effective for homogenizing a high-viscosity polymer. By using an n-stage static mixer, homogenization is divided into 2n, so that as n is larger, uniformization is further promoted, but there is also the problem of pressure loss or the generation of retention portions, so that it is necessary to select according to the required uniformity. For homogenization of the film, 5 to 20 steps are preferable, 7 to 15 steps are more preferable, and it is preferable to extrude the film from the die immediately after homogenization with a static mixer to form a film.

In addition, it is also possible to install a bleed valve in the extruder flow channel which can discharge the polymer that has deteriorated inside the extruder so that it does not pass through the filter or the die. However, since a switching portion is stagnant and causes foreign matter to be generated, the switching valve portion is required to have severe processing accuracy.
(Gear Pump)

In order to improve thickness accuracy, it is preferable to reduce the fluctuation of the discharge amount. By providing a gear pump between the extruder and the die and supplying a certain amount of resin from the gear pump, the thickness accuracy can be improved. The gear pump is housed in a state where a pair of gears consisting of a drive gear and a driven gear are meshed with each other, and by driving the drive gear and engaging and rotating both gears, the molten resin is sucked into the cavity from the suction port formed in the housing, and a certain amount of the resin is discharged from the outlet also formed in the housing. Even in a case where the resin pressure at a tip part of the extruder fluctuates slightly, the fluctuation is absorbed by using the gear pump, the fluctuation of the resin pressure downstream of the film forming apparatus is very small, and the thickness fluctuation is improved. By using the gear pump, the pressure fluctuation on a secondary side of the gear pump can be reduced to ⅕ or less of a primary side of the gear pump, and the resin pressure fluctuation range can be set to within ±1%.

Other merits are that filtration by a filter is possible without increasing the pressure at the tip part of the screw, so that it can be expected to prevent the resin temperature from rising, improve the transportation efficiency, and shorten the retention time in the extruder. In addition, it is possible to prevent the amount of resin supplied from the screw from fluctuating with time due to an increase in the filter pressure of the filter.

Type and Size

Normally, a two-gear type is used, in which quantification is performed by the meshing rotation of two gears, but in a case where the pulsation caused by the gears of the gear is a problem, it is generally used to use a three-gear type to interfere with each other's pulsation to reduce the pulsation. A size of the gear pump to be used is generally selected to have a capacity such that the rotation speed is 5 to 50 rpm under the extrusion conditions, preferably 7 to 45 rpm, and particularly preferably 8 to 40 rpm.

By selecting the size of the gear pump in which the rotation speed is within the above-described range, it is possible to suppress the resin temperature rise due to shear heat generation and suppress the resin deterioration due to the retention inside the gear pump.

In addition, since the gear pump is constantly worn by the meshing of gears, it is required to use a material having excellent abrasion resistance, and it is preferable to use an abrasion-resistant material same as the screw or the barrel.

Countermeasures for Retention Portions

Poor flow of the bearing circulation polymer of the gear pump may cause problems such as poor sealing by the polymer in the driving unit and the bearing unit, resulting in large fluctuations in weighing and liquid feed extrusion pressure. Therefore, it is necessary to design the gear pump (especially clearance) according to the melt viscosity of the liquid crystal polymer. In addition, in some cases, the retention portion of the gear pump causes deterioration of the liquid crystal polymer, so a structure with as little stagnant as possible is preferable. Further, a method of preventing a retained polymer from being mixed in the film by discharging the retained polymer of the bearing unit to the outside of the gear pump is also used. Further, in a case where the shear calorific value in the gear pump is large and the resin temperature rises, it is also effective to cool the gear pump by air cooling and/or circulating a cooling medium.

Operating Conditions

In a case where a difference between a primary pressure (input pressure) and a secondary pressure (output pressure) is too large in the gear pump, the load on the gear pump is large and the shear heat generation is large. Therefore, the differential pressure during operation is preferably 20 MPa or less, more preferably 15 MPa or less, and particularly preferably 10 MPa or less. It is also effective to control the screw rotation of the extruder or use a pressure control valve to keep the primary pressure of the gear pump constant in order to make the film thickness uniform.

(Die)

Type, Structure, and Material

The molten resin from which foreign matters have been removed by filtration and in which the temperature has been made uniform by a mixer is continuously sent to the die. Any type of commonly used T die, fishtail die, or hanger coat die can be used as long as the die is designed so that the retention of molten resin is small. Among these, the hanger coat die is preferable in terms of thickness uniformity and less retention.

A clearance of the T-die outlet portion is preferably 1 to 20 times, more preferably 1.5 to 15 times, and particularly preferably 2.0 to 10 times the film thickness. In a case where the lip clearance is 1 times or more of the film thickness, an increase in the internal pressure of the die can be suppressed, so that the film thickness can be easily controlled, and a sheet having a good surface shape can be obtained by film formation. In addition, in a case where the lip clearance is 20 times or less of the film thickness, it is possible to prevent the draft ratio from becoming too large, so that the sheet thickness accuracy is good.

The thickness of the film is generally adjusted by adjusting the clearance of the base at the tip part of the die, and it is preferable to use a flexible lip from the viewpoint of thickness accuracy, but in some cases, a choke bar may be used for adjustment.

The clearance adjustment of the base can be changed by using the adjustment bolt at the die outlet portion. The adjusting bolts are preferably arranged at intervals of 15 to 50 mm, more preferably at intervals of 35 mm or less, and particularly preferably at intervals of 25 mm or less. In a case where the interval is 50 mm or less, the occurrence of thickness unevenness between the adjusting bolts can be suppressed. In a case where the interval is 15 mm or more, stiffness of the adjusting bolt is sufficient, so that the fluctuation of the internal pressure of the die can be suppressed and the fluctuation of the film thickness can be suppressed. In addition, an inner wall surface of the die is preferably smooth from the viewpoint of wall retention, and for example, the surface smoothness can be improved by polishing. In some cases, after the inner wall surface is plated, the smoothness is increased by polishing, or peelability from the polymer is improved by vapor deposition.

In addition, it is preferable that the flow rate of the polymer discharged from the die is uniform in the width direction of the die. Therefore, it is preferable to change the manifold shape of the die to be used depending on the melt viscosity shear rate dependence of the liquid crystal polymer to be used.

In addition, it is preferable that the temperature of the polymer discharged from the die is also uniform in the width direction of the die. Therefore, it is preferable to make the temperature uniform by raising the set temperature of the die end part having a large heat dissipation of the die or by taking measures such as suppressing the heat dissipation of the die end part.

In addition, since insufficient processing accuracy of the die or foreign matter adhering to the die outlet portion causes die streaks to occur, which causes a significant deterioration in the quality of the film, the die lip portion is preferably smooth, and an arithmetic average surface roughness Ra of the die lip portion is preferably 0.05 μm or less, more preferably 0.03 μm or less, and particularly preferably 0.02 μm or less. A curvature radius R of the die lip edge portion is preferably 100 μm or less, more preferably 70 μm or less, and particularly preferably 50 μm or less. In addition, by spraying ceramic, one processed into a sharp edge with R=20 μm or less can also be used.

To reduce the thickness variation in long-term continuous production, an automatic thickness adjustment die that measures the film thickness downstream, calculates the thickness deviation, and feeds back the result to the thickness adjustment of the die is also effective.

The area between the die and the roll landing point of the polymer is called an air gap, and it is preferable that the air gap is short in order to improve the thickness accuracy or stabilize the film formation by reducing the neck-in amount (increasing the edge thickness by reducing the film width). By making the angle of the tip part of the die sharp or reducing the thickness of the die, it is possible to prevent interference between the roll and the die and shorten the air gap, but on the other hand, the stiffness of the die may decrease, and the pressure of the resin may cause the central portion of the die to open, resulting in a decrease in thickness accuracy. Therefore, it is preferable to select conditions which can achieve both the stiffness of the die and the shortening of the air gap.

Multi-Layer Film Formation

A single-layer film forming apparatus having a low equipment cost is generally used for manufacturing a film, but in order to provide a functional layer on the outer layer, a multi-layer film forming apparatus may be used to manufacture a film having two or more kinds of structures. Specific examples thereof include a method of performing multi-layering using a multi-layer feed block and a method of using a multi-manifold die. Generally, it is preferable to laminate the functional layer thinly on the surface layer, but the layer ratio is not particularly limited.

The retention time (retention time from passing through the extruder to discharging the die) from the pellets entering the extruder through the supply port and exiting from the supply unit (for example, die) is preferably 1 to 30 minutes, more preferably 2 to 20 minutes, and particularly preferably 3 to 10 minutes. From the viewpoint of thermal deterioration of the polymer, it is preferable to select equipment having a short retention time. However, in order to reduce the volume inside the extruder, for example, in a case where the capacity of the filtration filter is too small, the filter life may be shortened and the replacement frequency may increase. In addition, making the pipe diameter too small may also increase the pressure loss. For this reason, it is preferable to select equipment of appropriate size.

In addition, by setting the retention time to 30 minutes or less, it is easy to adjust the diameter corresponding to the maximum equivalent circle diameter of the bright portion to the above-described range.

(Cast)

The film forming step preferably includes a step of supplying the melted liquid crystal polymer from the supply unit and a step of landing the melted liquid crystal polymer on a cast roll to form a film. The melted liquid crystal polymer may be cooled and solidified and wound as it is as a film, or it may be passed between a pair of pressing compression surfaces and continuously pressed to form a film.

In this case, there is no particular limitation on the unit for supplying the liquid crystal polymer (melting) in a molten state. For example, as a specific unit for supplying the melting, an extruder which melts the liquid crystal polymer and extrudes it into a film may be used, an extruder and a die may be used, or the liquid crystal polymer may be once solidified into a film and then melted by a heating unit to form a melt, which may be supplied to the film forming step.

In a case where the molten resin extruded from the die into a sheet is pressed by a device having a pair of pressing compression surfaces, not only can the surface morphology of the compression surface be transferred to the film, but aligning properties can be controlled by imparting elongation deformation to the composition containing the liquid crystal polymer.

Film Forming Method and Type

Among the methods for forming a molten liquid crystal polymer into a film, it is preferable to pass between two rolls (for example, a touch roll and a chill roll) from the viewpoint that a high pinching pressure can be applied and the film surface is excellent. In the present specification, in a case where a plurality of cast rolls for transporting the melt are provided, the cast roll closest to the most upstream liquid crystal polymer supply unit (for example, die) is referred to as a chill roll. In addition, a method of pressing metal belts with each other or a method of combining a roll and a metal belt can also be used. In some cases, in order to improve adhesiveness with rolls or metal belts, a film forming method such as a static electricity application method, an air knife method, an air chamber method, and a vacuum nozzle method can be used in combination on a cast drum.

In addition, in a case of obtaining a film having a multi-layer structure, it is preferable to obtain the film by pressing the molten polymer extruded from the die in multiple layers, but it is also possible to obtain a multi-layer film by introducing a single-layer film into a pressing portion in the same manner as a melt-laminated film. Further, in this case, by changing the circumferential speed difference or the orientation axis direction of the pressing portion, films having different inclined structures in the thickness direction can be obtained, and by performing this step several times, it is possible to obtain films having three or more layers.

Furthermore, the touch roll may be periodically vibrated in the TD direction in a case of pinching to give deformation.

Roll Type and Material

As the cast roll, from the viewpoint of surface roughness, uniformity of pressing in a case of pinching, and uniformity of roll temperature, a metal roll having a stiffness is preferable. "having stiffness" is not determined only by the material of the compression surface, but is determined by considering the ratio between the thickness of a rigid material used for the surface portion and the thickness of the structure supporting the surface portion. For example, in a case where the surface portion is driven by a cylindrical support roll, it means that the ratio of the thickness of the outer cylinder of the rigid material/the diameter of the support roll is, for example, approximately $\frac{1}{80}$ or more.

Carbon steel and stainless steel are generally used as the material for the rigid metal roll, and chromium molybdenum steel, nickel chrome molybdenum steel, or cast iron can be used. Further, in order to modify the surface properties such as film peelability, plating treatment such as chromium or nickel, or processing such as ceramic spraying may be performed. In a case where a metal belt is used, the thickness of the belt is preferably 0.5 mm or more, more preferably 1 mm or more, and particularly preferably 2 mm or more in order to apply the necessary pinching pressure. In addition, in a case of using a rubber roll or a roll which combines a rubber roll and a metal sleeve, Since the hardness of the roll is low and the length of the pinching portion is long, the effective pinching pressure may not be high even in a case where a high linear pressure is applied between the rolls. Therefore, in order to apply the required pinching pressure, it is preferable to use a rubber having an extremely high hardness, and specifically, the rubber hardness is preferably 80° or more and more preferably 90° or more. However, since the rubber roll and the metal roll lined with rubber have large irregularities on the rubber surface, the smoothness of the film may decrease.

The roll nip length suitable for applying the pinching pressure by the pair of rolls is preferably more than 0 mm and within 5 m, and more preferably more than 0 mm and within 3 mm.

Roll Diameter

As the cast roll, it is preferable to use a roll having a large diameter, and specifically, the diameter is preferably 200 to 1500 mm. It is preferable to use a roll having a large diameter because the deflection of the roll can be reduced and a high pinching pressure can be uniformly applied in a case of pressing. In addition, in the manufacturing method of the present invention, the diameters of the two rolls to be pressed may be the same or different from each other.

Roll Hardness

In order to apply the pressure between rolls in the above-described range, a shore hardness of the roll is preferably 45 HS or more, more preferably 50 HS or more, and particularly preferably 60 to 90 HS. The shore hardness can be obtained from the average value of the values measured at 5 points in the roll width direction and 5 points in the circumferential direction using the method of JIS Z 2246.

Surface Roughness, Cylindricity, Roundness, and Diameter Runout

A surface of the cast roll or the touch roll preferably has an arithmetic average surface roughness Ra of 100 nm or less, more preferably 50 nm or less, and particularly preferably 25 nm or less.

The roundness is preferably 5 μm or less, more preferably 3 μm or less, and particularly preferably 2 μm or less. The cylindricity is preferably 5 μm or less, more preferably 3 μm or less, and particularly preferably 2 μm or less. The diameter runout is preferably 7 μm or less, more preferably 4 μm or less, and particularly preferably 3 μm or less. The cylindricity, roundness, and diameter runout can be obtained by the method of JIS B 0621.

Roll Surface Properties

As the cast roll and the touch roll, the surface is preferably a mirror surface, and generally, a roll having a hard chrome-plated surface mirror-finished is used. In addition, it is also preferable to use a roll in which nickel plating is laminated on a hard chrome plating base to prevent corrosion, or to use amorphous chrome plating to reduce the adhesiveness to the roll. Further, in order to improve abrasion resistance or film adhesion to rolls, surface processing such as titanium nitride (TiN), chromium nitride (CrN), or diamond like carbon (DLC) treatment, and Al, Ni, W, Cr, Co, Zr, or Ti-based ceramic spraying can also be performed.

The roll surface is preferably smooth from the viewpoint of film smoothness after film formation, but for surface unevenness formation to impart slipperiness of the film, a mirror pocket surface roll can be used, or a roll which has been blasted or a roll which has been dimpled to form fine irregularities on the film surface can be used. However, from the viewpoint of film smoothness, the unevenness of the roll is preferably Ra=10 μm or less. In addition, it is also possible to use a roll in which 50 to 1000 fine grooves or prism shapes having a depth of 0.1 to 10 μm are engraved on the surface of the roll per 1 $mm^2$.

Roll Temperature

It is preferable that the roll can quickly remove the heat supplied from the molten polymer and maintain a constant roll surface temperature. Therefore, it is preferable to pass a medium having a constant temperature inside the roll. As the medium, it is preferable to use water or heat medium oil, and in some cases gas, and select a medium flow rate and medium viscosity capable of sufficient heat exchange. In addition, as a unit for keeping the roll surface temperature constant, a known method can be used, but a roll provided with a spiral flow channel along the circumference of the roll is preferable. A heat pipe can also be used to make the roll temperature uniform.

Molten Polymer Temperature

From the viewpoint of improving the moldability of the liquid crystal polymer and suppressing deterioration, the discharge temperature (resin temperature at the outlet of the supply unit) is preferably (Tm of liquid crystal polymer−10)° C. to (Tm of liquid crystal polymer+40°) C. As a guide for the melt viscosity, 50 to 3500 Pa·s is preferable.

It is preferable that the cooling of the molten polymer between the air gaps is as small as possible, and it is preferable to reduce the temperature drop due to cooling by taking measures such as increasing the film forming speed and shortening the air gap.

Touch Roll Temperature

A temperature of the touch roll is preferably set to Tg or less of the liquid crystal polymer. In a case where the temperature of the touch roll is Tg or less of the liquid crystal polymer, the molten polymer can be suppressed from adhering to the roll, so that the film appearance is improved. For the same reason, the chill roll temperature is preferably set to Tg or less of the liquid crystal polymer.

Film Formation Speed and Circumferential Speed Difference

From the viewpoint of heat retention of the melting in the air gap, a film forming speed is preferably 3 m/min or more, more preferably 5 m/min or more, and particularly preferably 7 m/min or more. In a case where the line speed is increased, cooling of the melt in the air gap can be suppressed, and more uniform pinching pressure and shear deformation can be imparted in a case where the temperature of the melting is high. The film forming speed is defined as the slow second compression surface speed in a case where the molten polymer passes between the two rolls to be pinched.

It is preferable that the moving speed of the first compression surface is faster than the moving speed of the second compression surface. Furthermore, it is preferable that the film according to the embodiment of the present invention is manufactured by adjusting a moving speed ratio between the first compression surface and the second compression surface of the pinching device to 0.60 to 0.99, and applying shear stress in a case where the molten resin passes through the pinching device. The two compression surfaces may be driven around or independently, but are preferably driven independently from the viewpoint of uniformity of film properties.

(Procedure for Forming Polymer Film)

Film Formation Procedure

In the film forming step, it is preferable to perform the film formation by the following procedure from the viewpoint of film-forming process and the stabilization of quality.

The molten polymer discharged from the die is landed on a cast roll to form a film, which is then cooled and solidified and wound up as a film.

In a case of pressing the molten polymer, the molten polymer is passed between the first compression surface and the second compression surface set at a predetermined temperature, and then is cooled and solidified and wound up as a film.

Transport Tension

A transport tension of the film can be appropriately adjusted depending on the film thickness, and the transport tension per 1 m width of the film is preferably 10 to 500 N/m, more preferably 20 to 300 N/m, and particularly preferably 30 to 200 N/m. Generally, as the film is thicker, it is necessary to increase the transport tension. For example, in the case of a film having a thickness of 100 μm, 30 to 150 N/m is preferable, 40 to 120 N/m is more preferable, and 50 to 100 N/m is particularly preferable. In a case where the transport tension of the film is at least the lower limit value, meandering of the film during film transport can be suppressed, so that slippage between the guide roll and the film can be suppressed and scratches on the film can be suppressed. In a case where the transport tension of the film is the upper limit value or less, it is possible to suppress vertical wrinkles in the film, and it is possible to prevent the film from being forcibly stretched and broken.

For the tension control of the film, any method such as a dancer method, a torque control method using a servo motor, a powder clutch/brake method, and a friction roll control method may be used, but from the viewpoint of control accuracy, a dancer method is preferable. It is not necessary to make all the transport tensions the same value in the film forming step, and it is also useful to adjust the transport tension to an appropriate value for each zone where the tension is cut.

It is preferable that the transport roll has no roll deflection deformation due to transport tension, small mechanical loss, sufficient friction with the film, and a smooth surface so as not to be scratched during film transport. In a case where a transport roll having a small mechanical loss is used, a large tension is not required for transporting the film, and it is possible to suppress scratches on the film. In addition, it is preferable that the transport roll has a large holding angle of the film in order to remove friction with the film. The hugging angle is preferably 90° or more, more preferably 100° or more, and particularly preferably 120° or more. In a case where a sufficient holding angle cannot be obtained, it is preferable to use a rubber roll or a roll having a satin finish, a dimple shape, or a groove on the surface of the roll to secure friction.

Take-Up Tension

It is preferable to appropriately adjust a take-up tension according to the film thickness as well as the film transport tension. The tension per 1 m width of the film is preferably 10 to 500 N/m, more preferably 20 to 300 N/m, and particularly preferably 30 to 200 N/m. Generally, as the film is thicker, it is necessary to increase the tension. For example, in the case of a 100 µm film, the take-up tension is preferably 30 to 150 N/m, more preferably 40 to 120 N/m, and particularly preferably 50 to 100 N/m.

In a case where the take-up tension is the lower limit value or more, meandering of the film during film transport can be suppressed, so that the film can be prevented from slipping and scratching during winding. In a case where the take-up tension is the upper limit value or less, vertical wrinkles can be suppressed in the film, and tight winding of the film can be suppressed to improve the winding appearance. In addition, since the bump portion of the film can be suppressed from extending due to the creep phenomenon, flapping of the film can be suppressed. It is preferable that the take-up tension is detected by the tension control in the middle of the line as in the case of the transport tension, and the take-up tension is controlled so as to be a constant take-up tension. In a case where there is a difference in film temperature depending on the location of the film formation line, the length of the film may differ slightly due to thermal expansion, so that it is preferable to adjust a drawing ratio between the nip rolls so that the film is not tensioned more than specified in the middle of the line. In addition, the take-up tension can be taken up at a constant tension by controlling the tension control, but it is more preferable to taper according to the take-up diameter to obtain an appropriate take-up tension. Generally, the tension is gradually reduced as the winding diameter is increased, but in some cases, it may be preferable to increase the tension as the winding diameter is increased. In addition, there is no problem in the winding direction regardless of which side of the first compression surface or the second compression surface is the winding core side, but in a case where the film is curled, winding it in the direction opposite to the curl has a curl correction effect and may be preferable. It is useful to install edge position control (EPC) to control the meandering of the film during winding, perform oscillation winding to prevent the generation of winding bumps, or to use a roll which eliminates accompanying air during high-speed winding.

Winding Core

The winding core used for winding does not need to be special as long as it has the strength and stiffness required to wind the film, and generally, a paper tube having an inner diameter of 3 to 6 inches or a plastic winding core having an inner diameter of 3 to 14 inches is used. In general, from the viewpoint of low dust generation, a plastic winding core is often used. Although it is cost-effective to use a winding core having a small diameter, a defective winding shape may occur due to bending due to insufficient stiffness, or the film may be curled due to creep deformation at the winding core portion. On the other hand, using a large-diameter winding core is advantageous for maintaining the quality of the film, but may be disadvantageous in terms of handleability and cost. Therefore, it is preferable to appropriately select a winding core of an appropriate size. In addition, it is also possible to provide a cushioning layer on the outer peripheral portion of the winding core to prevent a step corresponding to the film thickness at the winding start portion from being transferred to the film.

Slit

It is preferable that both ends of the formed film are slit in order to obtain a predetermined width. As a slit method, a general method such as a shear cut blade, a Goebel blade, a leather blade, and a rotary blade can be used, but it is preferable to use a cutting method in which dust is not generated during cutting and the burr of the cut portion is small, and cutting with a Goebel blade is preferable. A material of the cutter blade may be either carbon steel or stainless steel, but in general, it is preferable to use a carbide blade or a ceramic blade because the life of the blade is long and the generation of chips is suppressed.

The part cut off by the slit can be crushed and used again as a raw material. After slitting, it may be pulverized and immediately put into an extruder, or it may be pelletized once by an extruder and used. In addition, foreign matter may be removed by filtration in the repelleting step. The blending amount is preferably 0% to 60%, more preferably 5% to 50%, and particularly preferably 10% to 40%. Since recycled raw materials may differ from virgin raw materials in the melt viscosity of the molten polymer or the trace composition produced by thermal degradation, it is necessary to be careful in a case of using the recycled raw materials. It is also useful to control physical properties of the raw material within a certain range by appropriately adjusting the blending amount according to composition of the recycled raw material. In addition, the film in a case of thickness adjustment or switching can be reused in the same manner as the slit selvage.

Knurling Processing

It is also preferable to perform a thickening processing (knurling treatment) on one end or both ends of the film. A height of an unevenness due to the thickening processing is preferably 1 to 50 µm, more preferably 2 to 30 µm, and particularly preferably 3 to 20 In the thickening processing, both sides may be convex or only one side may be convex. A width of the thickening processing is preferably 1 to 50 mm and particularly preferably 3 to 30 mm. Both cooling and heating can be used for the thickening processing, and in a case where an appropriate method is selected depending on the unevenness formed on the film or the state of dust generation during the thickening processing. It is also useful to make it possible to identify the film forming direction and the film surface by knurling processing.

Masking Film

It is also preferable to attach a lami-film (masking film) on one side or both sides in order to prevent scratches on the film or improve handleability. A thickness of the lami-film is preferably 5 to 100 μm, more preferably 10 to 70 μm, and particularly preferably 25 to 50 μm.

The masking film is preferably composed of two layers, a base material layer and a pressure-sensitive adhesive layer. As the base material layer, low density polyethylene (LDPE), linear low density polyethylene (LLDPE), high density polyethylene (HDPE), polypropylene (PP), polyester, and the like can be used. As the pressure-sensitive adhesive layer, ethylene vinyl acetate (EVA), acrylic rubber, styrene-based elastomer, natural rubber, and the like can be used. In addition, it is possible to use either the type by a co-extrusion method or the type in which the adhesive material is applied to the film.

An adhesive strength is preferably 0.2 to 2.0 N/25 mm, more preferably 0.3 to 1.5 N/25 mm, and particularly preferably 0.4 to 1.0 N/25 mm. The adhesive strength can be determined by a method according to JIS Z 0237.

Generally, a colorless masking film is often used, but in order to distinguish the front and back of the film, different colors may be used on the front and back. As another method for distinguishing the front and back of the film, it is also effective to attach a masking film having different thickness, adhesive strength, and glossiness of the film surface.

Static Elimination

In a case where the film is charged, dust in the atmosphere is attracted to the film and becomes foreign matter adhering to the film. Therefore, it is preferable that the film being formed, transported, and wound is not charged.

A band voltage is preferably 3 KV or less, more preferably 0.5 KV or less, and particularly preferably 0.05 KV or less.

As a method of preventing the generation of static electricity on the film, various known methods such as a method of preventing the occurrence of static electricity by kneading or applying an antistatic agent to the film, a method of controlling the temperature and humidity of the atmosphere to suppress the generation of static electricity, a method of grounding and releasing static electricity charged on the film, and a method neutralizing with a charge having the opposite sign to the charge using an ionizer, can be used. Among these, a method using an ionizer is common. There are two types of ionizers, a soft X-ray irradiation type and a corona discharge type, and any type can be used. In a case where explosion protection is required, a soft X-ray irradiation type is used, but in general, a corona discharge type is often used. The corona discharge method includes a direct current (DC) type, an alternating current (AC) type, and a pulse AC type, and the pulse AC type is widely used from the viewpoint of performance and cost. The static eliminator may be used alone or in combination of a plurality of types, and the number of static eliminators installed is not particularly limited as long as the film formation is not hindered.

In addition, in order to improve the effect of preventing dust from adhering to the film by static elimination, the environment at the time of film formation is preferably the US federal standard Fed. Std. 209D class 10000 or less, more preferably class 1000 or less, and particularly preferably class 100 or less.

Dust Removal

Foreign matter adhering to the film surface can be removed by a method of pressing a scraper or a brush, a method of ejecting charge-neutralized pressurized air at a pressure of several tens of KPa in order to weaken the attraction effect due to static electricity, a method by suction, or a method in which injection and suction are combined. In addition, known dust removing methods such as a method of pressing a sticky roll against the film and transferring foreign matter to the sticky roll to remove foreign matter and a method of applying ultrasonic waves to the film to suck and remove foreign matter can be used. Further, a method of spraying a liquid on the film and a method of immersing the film in the liquid to wash away foreign matter can also be used. Further, in a case where film powder is generated at the cut part by the cutter or the knurled part, it is also preferable to attach a removing device such as a vacuum nozzle to prevent foreign matter from adhering to the film.

(Stretching and Relaxation Treatment)

Furthermore, after forming an un-stretched film by the above-described method, stretching and/or relaxation treatment may be performed. For example, each step can be carried out by the combination of the following (a) to (g). In addition, the order of machine-direction stretching and cross-direction stretching may be reversed, each step of machine-direction stretching and cross-direction stretching may be performed in multiple stages, or diagonal stretching, simultaneous biaxial stretching, or the like may be combined.

(a) Cross-direction stretching
(b) Cross-direction stretching→relaxation treatment
(c) Machine-direction stretching
(d) Machine-direction stretching→relaxation treatment
(e) Machine-direction (cross-direction) stretching→cross-direction (machine-direction) stretching
(f) Machine-direction (cross-direction) stretching→cross-direction (machine-direction) stretching→relaxation treatment
(g) Cross-direction stretching→relaxation treatment→machine-direction stretching→relaxation treatment Machine-Direction Stretching The machine-direction stretching can be achieved by making the circumferential speed on the outlet side faster than the circumferential speed on the inlet side while heating between the two pairs of rolls. From the viewpoint of film curl, the film temperature is preferably the same on the front and back surfaces, but in a case where optical characteristics are controlled in the thickness direction, stretching can be performed at different temperatures on the front and back surfaces. The stretching temperature here is defined as the temperature on the lower side of the film surface. The machine-direction stretching step may be carried out in one step or in multiple steps. The film is generally preheated by passing it through a temperature-controlled heating roll, but in some cases, a heater can be used to heat the film. In addition, in order to prevent the film from adhering to the roll, a ceramic roll or the like having improved adhesiveness can also be used.

[Cross-Direction Stretching]

As the cross-direction stretching step, ordinary cross-direction stretching can be adopted. That is, the normal cross-direction stretching is a cross-direction stretching method in which both ends of the film are gripped by clips and the clips are widened while being heated in an oven using a tenter. For example, methods described in JP1987-035817U (JP-S62-035817U), JP2001-138394A, JP1998-249934A (JP-H10-249934A), JP1994-270246A (JP-H6-270246A), JP1992-30922U (JP-114-30922U), and JP1987-152721A (JP-S62-152721A) can be used.

A stretching temperature in the cross-direction stretching step can be controlled by blowing air at a desired temperature into the tenter. The film temperature may be the same or different on the front and back surfaces for the same reason as in the machine-direction stretching step. The stretching temperature used here is defined as the temperature on the lower side of the film surface. The cross-direction stretching step may be carried out in one step or in multiple steps. In addition, in a case of performing cross-direction stretching in multiple stages, it may be performed continuously or intermittently by providing a zone in which widening is not performed. For such cross-direction stretching, in addition to the normal cross-direction stretching in which the clip is widened in the width direction in the tenter, the following stretching method for gripping and widening the clip with the clip can also be applied.

Diagonal Stretching

As with normal cross-direction stretching, the clips are widened in the cross direction, but can be stretched diagonally by changing the transportation speed of the left and right clips. For example, methods described in JP2002-22944A, JP2002-086554A, JP2004-325561A, JP2008-23775A, and JP2008-110573A can be used.

Simultaneous Biaxial Stretching

The simultaneous biaxial stretching widens the clip in the cross direction and at the same time stretches or contracts in the machine direction, similar to the normal cross-direction stretching. For example, methods described in JP1980-093520U (JP-S55-093520U), JP1988-247021A (JP-S63-247021A), JP1994-210726A (JP-H6-210726A), JP1994-278204A (JP-H6-278204A), JP2000-334832A, JP2004-106434A, JP2004-195712A, JP2006-142595A, JP2007-210306A, JP2005-022087A, and JP2006-517608B can be used.

Improvement of Bowing (Axis Misalignment)

In the above-described cross-direction stretching step, since the end part of the film is gripped by the clip, the deformation of the film due to the heat shrinkage stress generated during the heat treatment is large at the center of the film and small at the edges, and as a result, the characteristics in the width direction can be distributed. In a case where a straight line is drawn along the cross direction on the surface of the film before the heat treatment step, the straight line on the surface of the film after the heat treatment step is an arcuate shape in which the center portion is recessed toward the downstream side. This phenomenon is called a bowing phenomenon, and is a cause of disturbing isotropy and widthwise uniformity of the film.

As an improvement method, it is possible to reduce the variation in the orientation angle due to the bowing by performing preheating before such cross-direction stretching and heat fixing after stretching. Either preheating or heat fixing may be performed, but it is more preferable to perform both. It is preferable to perform these preheating and heat fixing by gripping with a clip, that is, it is preferable to perform these preheating and heat fixing continuously with the stretching.

The preheating is preferably performed at a temperature higher than the stretching temperature by approximately 1° C. to 50° C., more preferably higher than 2° C. to 40° C., and particularly preferably higher than 3° C. to 30° C. The preheating time is preferably 1 second to 10 minutes, more preferably 5 seconds to 4 minutes, and particularly preferably 10 seconds to 2 minutes.

During preheating, it is preferable to keep the width of the tenter almost constant. Here, "almost" refers to ±10% of the width of the un-stretched film.

The heat fixing is preferably performed at a temperature 1° C. to 50° C. lower than the stretching temperature, more preferably lower than 2° C. to 40° C., and still more preferably lower than 3° C. to 30° C. Particularly preferably, the temperature is not higher than the stretching temperature and not higher than Tg of the liquid crystal polymer.

The preheating time is preferably 1 second to 10 minutes, more preferably 5 seconds to 4 minutes, and particularly preferably 10 seconds to 2 minutes. During heat fixing, it is preferable to keep the width of the tenter almost constant. Here, "almost" means 0% (the same width as the tenter width after stretching) to −30% (30% smaller than the tenter width after stretching=reduced width) of the tenter width after the completion of stretching. In a case where the width is expanded more than the stretched width, residual strain is likely to occur in the film. Examples of other known methods include methods described in JP1889-165423A (JP-H1-165423A), JP1992-216326A (JP-H3-216326A), JP2002-018948A, and JP2002-137286A.

Relaxation Treatment

The heat shrinkage rate can be reduced by performing a heat relaxation treatment under the following conditions after the above-described stretching. It is preferable that the heat relaxation treatment is carried out at at least one timing after film formation, machine-direction stretching, or cross-direction stretching. The relaxation treatment may be continuously performed online after the stretching, or may be performed offline after winding after the stretching.

(Surface Treatment)

By surface-treating the film, it is possible to improve the adhesion with the copper foil or the copper plating layer used for the copper-clad laminate. For example, glow discharge treatment, ultraviolet irradiation treatment, corona treatment, flame treatment, or acid or alkali treatment can be used. The aforementioned glow discharge treatment may be a treatment with a low-temperature plasma generated in a gas at a low pressure ranging from $10^{-3}$ to 20 Torr, and is preferably a plasma treatment under atmospheric pressure.

A plasma-excited gas refers to a gas that is plasma-excited under the above-described conditions. Examples thereof include fluorocarbons such as argon, helium, neon, krypton, xenon, nitrogen, carbon dioxide, and tetrafluoromethane, mixtures of these, and the like. It is also preferable to provide an undercoat layer for adhesion to the copper foil or the copper plating layer. This layer may be applied after the above-described surface treatment, or may be applied without the surface treatment. These surface treatment and undercoating steps can be incorporated at the end of the film forming step, can be carried out independently, or can be carried out in the copper foil or copper plating layer applying step.

(Aging)

It is also useful to age the film at a temperature of Tg or lower of the liquid crystal polymer in order to improve the mechanical properties, thermal dimensional stability, or winding shape of the wound film.

(Storage Conditions)

In order to prevent wrinkles or bumps from being generated due to the relaxation of residual strain of the wound film, it is preferable to store the film in a temperature environment of Tg or lower of the liquid crystal polymer. In addition, the temperature is preferably less variable, and the temperature fluctuation per hour is preferably 30° C. or lower, more preferably 20° C. or lower, and particularly preferably 10° C. or lower. Similarly, in order to prevent changes in the hygroscopicity of the film or prevent condensation, the humidity is preferably 10% to 90%, more preferably 20% to 80%, and particularly preferably 30% to 70%, and the temperature fluctuation per hour is preferably 30% or less, more preferably 20% or less, and particularly preferably 10% or less. In a case where the storage is required in a place where the temperature and humidity fluctuate, it is also effective to use a packaging material having moisture-proof or heat-insulating properties.

In the above, the film has a single layer, but may have a laminated structure in which a plurality of layers are laminated.

[Use of Polymer Film]

The polymer film according to the embodiment of the present invention can be used in a form of a single film, a copper-clad laminated board laminated with a copper foil, a flexible printed wiring board (FPC), and the like, and can be used as a material included in a substrate for communication. That is, the substrate for communication according to the embodiment of the present invention includes the polymer film according to the embodiment of the present invention.

EXAMPLES

Hereinafter, the present invention will be described in more detail with reference to Examples. The materials, the amounts of materials to be used, the proportions, the treatment details, the treatment procedure, or the like shown in the examples below may be modified appropriately as long as the modifications do not depart from the spirit of the present invention. Accordingly, the scope of the present invention is not limited to the following Examples.

Example 1

[Pelleting Step]

As a liquid crystal polymer, a thermoplastic liquid crystal polyester manufactured by Polyplastics Co., Ltd. (product name "LAPEROS A-950", melting point: 280° C., refer to Formula (I); in Table 1, indicated as "LCP A"), and as a component A, silica particles 1 manufactured by Admatechs. (product name "ADMANANO", average primary particle diameter: 100 nm) were used.

10 parts by mass of the component A was added to 90 parts by mass of the liquid crystal polymer, and the mixture was kneaded and pelletized using a biaxial extruder. A shear rate of the biaxial extruder during kneading and pelletizing (hereinafter, also referred to as a "shear rate (pelletization)") was set to 300 sec$^{-1}$.

The kneaded pellets were dried at 80° C. using a dehumidifying hot air dryer having a dew point temperature of −45° C. for 12 hours to reduce the moisture content in the kneaded pellets to 50 ppm by mass or less.

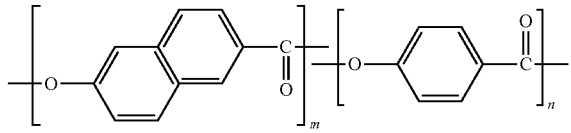

(I)

[Film Formation Step]

100 parts by mass of the dried kneaded pellets, 0.1 parts by mass of a solid lubricant (stearic acid), and 0.1 parts by mass of a solid heat stabilizer (irganox 1010 (manufactured by BASF)) were supplied into a cylinder from the same supply port of the biaxial extruder having a screw diameter of 50 mm, and heated and kneaded at 305° C. to 315° C. to obtain a kneaded material. Thereafter, a film-like kneaded material in a molten state was discharged from a die having a die width of 750 mm and a slit spacing of 300 μm. A time from that the kneaded material passed through the biaxial extruder until the film-like kneaded material was discharged from the die (hereinafter, also referred to as a "retention time (during film formation)") was set to 8 minutes.

A thickness unevenness in a width direction of the film was improved by finely adjusting a clearance of a die lip portion. In this way, a polymer film of Example 1, having a thickness of 100 μm, was obtained.

Example 2, Example 3, and Comparative Example 1

Polymer films of Example 2, Example 3, and Comparative Example 1 were obtained in the same manner as in Example 1, except that, instead of the silica particles 1, silica particles 2 manufactured by Admatechs. (product name "ADMAFINE", average primary particle diameter: 1,000 nm), silica particles 3 (product name "ADMAFUSE", average primary particle diameter: 10,000 nm), or silica particles 4 (product name "ADMAFUSE", average primary particle diameter: 11,000 nm) were used.

Comparative Example 2

A polymer film of Comparative Example 2 was obtained in the same manner as in Example 1, except that the retention time (during film formation) was changed to a time shown in Table 1.

Examples 4 and 5

Polymer films of Examples 4 and 5 were obtained in the same manner as in Example 1, except that, instead of the silica particles 1, COC (cyclic olefin copolymer, product name "TOPAS", manufactured by Polyplastics Co, Ltd.) or SEBS (polystyrene-poly(ethylene-butylene)-polystyrene triblock copolymer, product name "TUFTEC", manufactured by Asahi Kasei Corporation) was used.

Example 6

A polymer film of Example 6 was obtained in the same manner as in Example 1, except that, instead of the silica particles 1, PE (polyethylene resin, product name "Novatec", manufactured by Japan Polyethylene Corporation) was used, and the shear rate (pelletization) and the retention time (during film formation) were changed to a rate shown in Table 1.

Example 7

A polymer film of Example 7 was obtained in the same manner as in Example 1, except that, instead of the silica particles 1, PE (polyethylene resin, product name "Novatec", manufactured by Japan Polyethylene Corporation) was used.

Comparative Example 3

A polymer film of Comparative Example 3 was obtained in the same manner as in Example 6, except that the shear rate (pelletization) was changed to a rate shown in Table 1.

Comparative Example 4

A polymer film of Comparative Example 4 was obtained in the same manner as in Example 1, except that the component A was not used.

Examples 8 and 9

Polymer films of Examples 8 and 9 were obtained in the same manner as in Example 2, except that the amount of the component A added was adjusted so that the area ratio of the island-shaped region was as shown in Table 1.

Examples 10 to 13

Polymer films of Examples 10 and 13 were obtained in the same manner as in Example 2, except that the speed of the cast roll was adjusted so that the thickness of the polymer film was as shown in Table 1.

[Measurement of Physical Properties]

The above-described polymer film was evaluated by performing the following measurements.

[Maximum Equivalent Circle Diameter of Bright Portion]

20 different points of the polymer film were cut using a microtome along a direction parallel to a main surface of the polymer film (that is, a direction orthogonal to a thickness direction of the polymer film), and a flaky sample having a predetermined thickness (for example, 10 μm) was cut out to obtain 20 observation samples.

Next, 20 observation images corresponding to the observation region were obtained by observing the main surface of the observation sample from a normal direction under a crossed nicol environment with a polarization microscope (product name "BH-2", manufactured by Olympus Corporation). As a magnification for observation, an appropriate magnification in a range of 10 to 1000 times was selected.

Next, for each of the 20 observation images, an outer circumference of the bright portion was traced, and a diameter of a circle having the same area as the traced region (equivalent circle diameter) was measured by an image analysis device. Thereafter, the maximum value of the equivalent circle diameter of the bright portion obtained from the 20 observation images was defined as the maximum equivalent circle diameter of the bright portion.

[Area Ratio of Bright Portion]

For each of the 20 observation images obtained by the above-described method for measuring the maximum equivalent circle diameter of the bright portion, the total area of the equivalent circle diameter of the bright portion was calculated, and a proportion (%) of the total area of the equivalent circle diameter of the bright portion to the total area of the observation image was calculated. Thereafter, an arithmetic mean value in the 20 observation images was obtained, and defined as the area ratio of the bright portion.

[Equivalent Circle Diameter of Island-Shaped Region]

In 10 different points of the polymer film, the polymer film was cut so as to obtain a fractured cross section which is parallel to a width direction of the polymer film and perpendicular to a surface of the polymer film. In addition, in 10 different points of the polymer film, the polymer film was cut so as to obtain a fractured cross section which is parallel to a longitudinal direction of the polymer film and perpendicular to the surface of the polymer film.

Next, using a scanning electron microscope (SEMEDX Type H, manufactured by Hitachi High-Tech Corporation), 20 observation images corresponding to the observation region were obtained by observing the obtained 20 fractured cross sections in total. The observation was performed by selecting an appropriate magnification in a range of 100 to 100000 times, and the images were taken so that the entire region in the thickness direction of the polymer film could be observed.

For any 200 island-shaped regions in the 20 observation images, an outer circumference of the island-shaped region was traced, and a diameter of a circle having the same area as the traced region (equivalent circle diameter) was measured by an image analysis device. Thereafter, an arithmetic mean value of the equivalent circle diameter of the 200 island-shaped regions was defined as the equivalent circle diameter of the island-shaped region.

[Area Ratio of Island-Shaped Region]

From each of the 20 observation images obtained by the above-described method for measuring the equivalent circle diameter of the island-shaped region, a square region of 10 μm in length×10 μm in width (selected region) was selected.

Next, an outer circumference of the island-shaped region existing in the selected region was traced, the total area occupied by the island-shaped region was measured by an image analysis device, and a proportion (%) of the total area of the island-shaped region to an area of the selected region was calculated. Thereafter, an arithmetic mean value in the 20 observation images was obtained, and defined as the area ratio of the island-shaped region.

[Distance Between Island-Shaped Regions]

From each of the 20 observation images obtained by the above-described method for measuring the equivalent circle diameter of the island-shaped region, a square region of 10 μm in length×10 μm in width (selected region) was selected.

Next, an outer circumference of the island-shaped region existing in the selected region was traced, and the shortest distance between different island-shaped regions was measured by an image analysis device. Thereafter, an arithmetic mean value in the 20 observation images was obtained, and defined as the distance between island-shaped regions.

[Thickness]

Using a thickness gauge of a contact type (manufactured by Mitutoyo Corporation), an arithmetic mean value of thicknesses of the polymer film at 100 different points was obtained and used as the thickness of the polymer film.

[Young's Modulus Ratio]

A Young's modulus ratio of the polymer film was measured by a tensile test in JIS K 7127. A center portion of the polymer film was measured at 5 points each in the MD direction and the TD direction, and a value obtained by dividing the average value in the MD direction by the average value in the TD direction was used as the Young's modulus ratio. It can be said that, as the value is closer to 1, the anisotropy of Young's modulus in the polymer film was smaller.

[Dielectric Loss Tangent Ratio and Permittivity Ratio]

A dielectric loss tangent and a permittivity were measured by a resonant perturbation method at a frequency of 10 GHz. Specifically, a 1 GHz cavity resonator (KANTO Electronic Application and Development Inc.) was connected to a network analyzer ("E8362B" manufactured by Agilent Technologies, Inc.), a minute material (width: 2.7 mm×length: 45 mm) was inserted into the cavity resonator, and under an environment of a temperature of 20° C. and a humidity of 65% RH, the dielectric loss tangent and the permittivity were measured from a change in resonance frequency before and after the insertion for 96 hours. A center portion of the polymer film was measured at 5 points each in the MD direction and the TD direction, and a value obtained by dividing the average value in the MD direction by the average value in the TD direction was used as the dielectric loss tangent ratio and the permittivity ratio. It can be said that, as the value is closer to 1, the anisotropy of dielectric loss tangent and permittivity in the polymer film was smaller.

[Cte Ratio]

A linear expansion factor (CTE) of the polymer film was measured according to JIS K 7197. A center portion of the polymer film was measured at 5 points each in the MD direction and the TD direction, and a value obtained by dividing the average value in the MD direction by the average value in the TD direction was used as the CTE ratio.

Based on the obtained CTE ratio, the anisotropy of linear expansion factor in the polymer film was evaluated by the following evaluation standard.

A: 0.8<CTE ratio<1.5
B: 0.5<CTE ratio≤0.8 or 1.5≤CTE ratio<2.0
C: CTE ratio≤0.5 or 2.0≤CTE ratio

[Arithmetic Average Surface Roughness Ra]

An arithmetic average surface roughness Ra of the polymer film was measured using a stylus type roughness meter according to JIS B 0601. 5 randomly selected points within the center of 10 cm×10 cm of the film were measured, and the average value was obtained.

Evaluation was performed according to the following standard based on the obtained values.

A: less than 300 nm
B: 300 nm or more and less than 400 nm
C: 400 nm or more

In Table 1, the "Shear rate (pelletization)" means a shear rate of the biaxial extruder during kneading and pelletizing in the above-described pelleting step, and the "Retention time (during film formation)" means a time from that the kneaded material passed through the biaxial extruder until the film-like kneaded material was discharged from the die in the above-described film formation step.

TABLE 1

| | Polymer film | | | | | | |
|---|---|---|---|---|---|---|---|
| | Liquid crystal polymer | | | Component A | | | |
| | Type | Maximum equivalent circle diameter of bright portion μm | Area ratio of bright portion % | Type | Equivalent circle diameter of island-shaped region μm | Area ratio of island-shaped region % | Distance between island-shaped regions μm |
| Example 1 | LCP A | 2 | 25 | Silica particles 1 | 0.1 | 10 | 0.04 |
| Example 2 | LCP A | 4 | 38 | Silica particles 2 | 1.0 | 10 | 0.38 |
| Example 3 | LCP A | 9 | 51 | Silica particles 3 | 10.0 | 10 | 3.79 |
| Comparative Example 1 | LCP A | 13 | 63 | Silica particles 4 | 11.0 | 10 | 4.15 |
| Comparative Example 2 | LCP A | 11 | 82 | Silica particles 1 | 0.1 | 10 | 0.04 |
| Example 4 | LCP A | 9 | 60 | COC | 1.5 | 10 | 0.55 |
| Example 5 | LCP A | 7 | 52 | SEBS | 1.0 | 10 | 0.37 |
| Example 6 | LCP A | 0.4 | 20 | PE | 0.04 | 10 | 0.01 |
| Example 7 | LCP A | 4 | 45 | PE | 0.9 | 10 | 0.32 |
| Comparative Example 3 | LCP A | 12 | 45 | PE | 10.5 | 10 | 4.01 |
| Comparative Example 4 | LCP A | 14 | 93 | None | — | 0 | — |
| Example 8 | LCP A | 1 | 9 | Silica particles 2 | 1.0 | 50 | 0.02 |
| Example 9 | LCP A | 0.5 | 9 | Silica particles 2 | 1.0 | 55 | 0.01 |
| Example 10 | LCP A | 3 | 32 | Silica particles 2 | 1.0 | 10 | 0.36 |
| Example 11 | LCP A | 4 | 35 | Silica particles 2 | 1.0 | 10 | 0.37 |
| Example 12 | LCP A | 7 | 44 | Silica particles 2 | 1.0 | 10 | 0.37 |
| Example 13 | LCP A | 9 | 49 | Silica particles 2 | 1.0 | 10 | 0.36 |

| | Physical properties of polymer film | | | | | | |
|---|---|---|---|---|---|---|---|
| | Process | | | | Dielectric | | Evaluation |
| | Shear rate (pelletization) sec⁻¹ | Retention time (during film formation) min | Thickness μm | Young's modulus ratio — | loss tangent ratio — | Permittivity ratio — | CTE ratio — / Ra nm |
| Example 1 | 300 | 8 | 100 | 1.2 | 1.1 | 1.0 | A 1.1 / A 180 |
| Example 2 | 300 | 8 | 100 | 1.5 | 1.2 | 1.2 | A 1.2 / A 197 |
| Example 3 | 300 | 8 | 100 | 1.7 | 1.3 | 1.1 | A 1.4 / B 343 |
| Comparative Example 1 | 300 | 8 | 100 | 1.9 | 1.3 | 1.2 | C 2.1 / C 406 |
| Comparative Example 2 | 300 | 32 | 100 | 2.0 | 1.5 | 1.3 | C 2.2 / A 191 |
| Example 4 | 300 | 8 | 100 | 1.8 | 1.3 | 1.2 | B 1.8 / B 389 |

TABLE 1-continued

| | | | | | | | | |
|---|---|---|---|---|---|---|---|---|
| Example 5 | 300 | 8 | 100 | 1.6 | 1.2 | 1.2 | B 1.6 | A 298 |
| Example 6 | 500 | 4 | 100 | 1.1 | 0.9 | 1.0 | A 0.9 | A 197 |
| Example 7 | 300 | 8 | 100 | 1.5 | 1.1 | 1.0 | A 1.4 | A 266 |
| Comparative Example 3 | 50 | 8 | 100 | 1.5 | 1.1 | 1.0 | C 2.0 | C 420 |
| Comparative Example 4 | 300 | 8 | 100 | 2.3 | 1.8 | 1.7 | C 2.5 | A 201 |
| Example 8 | 300 | 8 | 100 | 1.0 | 0.9 | 1.0 | A 1.0 | B 302 |
| Example 9 | 300 | 8 | 100 | 0.9 | 0.8 | 0.8 | A 0.9 | B 395 |
| Example 10 | 300 | 8 | 5 | 1.3 | 1.1 | 1.0 | A 1.2 | A 204 |
| Example 11 | 300 | 8 | 50 | 1.4 | 1.2 | 1.1 | A 1.2 | A 199 |
| Example 12 | 300 | 8 | 1000 | 1.7 | 1.2 | 1.0 | A 1.4 | A 276 |
| Example 13 | 300 | 8 | 1050 | 1.9 | 1.3 | 1.3 | B 1.6 | A 290 |

As shown in Table 1, it was shown that the polymer film having the maximum equivalent circle diameter of the bright portion of 10 μm or less had a small anisotropy of linear expansion factor (Examples).

From the comparison of Examples 1 to 3, in a case where the inorganic particles were used as the component A and the equivalent circle diameter of the island-shaped region was in a range of 0.01 to 1 μm (Examples 1 and 2), it was shown that the anisotropy of linear expansion factor could be smaller.

From the comparison of Examples 4 to 7, in a case where the polymer was used as the component A, it was shown that the equivalent circle diameter of the island-shaped region could be controlled by the type of the polymer. In addition, in a case where a polymer in which the equivalent circle diameter of the island-shaped region was in a range of 0.01 to 1 μm was used (Examples 5 and 7), it was shown that the anisotropy of linear expansion factor could be smaller.

From the comparison of Examples 2, 8, and 9, in a case where the area ratio of the island-shaped region was in a range of 1% to 50% (Examples 2 and 8), it was shown that the balance between the reduction of the anisotropy of linear expansion factor and the reduction of the surface roughness Ra was excellent.

From the comparison of Examples 2, and 10 to 13, in a case where the thickness of the polymer film was in a range of 5 to 1000 μm (Examples 2, and 10 to 12), it was shown that the anisotropy of linear expansion factor could be smaller and the surface roughness Ra could be smaller.

As shown in Table 1, it was shown that the polymer film having the maximum equivalent circle diameter of the bright portion of more than 10 μm had a high anisotropy of linear expansion factor (Comparative Examples).

What is claimed is:

1. A polymer film comprising:
   a liquid crystal polymer, and
   a component consisting of inorganic particles, wherein
   an average primary particle diameter of the inorganic particles is in a range of 1,000 nm to 10,000 nm, and
   in a case of observing a surface of the polymer film under a crossed nicol environment with a polarization microscope, a plurality of bright portions are observed in an observation region, and
   in the plurality of bright portions, an equivalent circle diameter of a bright portion having a maximum equivalent circle diameter is 10 μm or less.

2. The polymer film according to claim 1,
   wherein a proportion of a total area of the bright portions to an area of the observation region with the polarization microscope is 60% or less.

3. The polymer film according to claim 2,
   wherein, in a case of observing a vertical cross section of the polymer film with respect to the surface of the polymer film with a scanning electron microscope, a plurality of island-shaped regions consisting of the component are observed in an observation region, and an equivalent circle diameter of the island-shaped regions is 0.001 to 10 μm.

4. The polymer film according to claim 3,
   wherein a proportion of a total area of the island-shaped regions to an area of the observation region with the scanning electron microscope is 1% to 60%.

5. The polymer film according to claim 2,
   wherein a proportion of a Young's modulus in a second direction in a plane of the polymer film orthogonal to a first direction to a Young's modulus in the first direction in the plane of the polymer film is 0.5 to 1.9.

6. The polymer film according to claim 2,
   wherein a proportion of a dielectric loss tangent in a second direction in a plane of the polymer film orthogonal to a first direction to a dielectric loss tangent in the first direction in the plane of the polymer film is 0.5 to 1.5.

7. The polymer film according to claim 2,
   wherein a proportion of a dielectric constant in a second direction in a plane of the polymer film orthogonal to a first direction to a dielectric constant in the first direction in the plane of the polymer film is 0.5 to 1.5.

8. The polymer film according to claim 1,
   wherein, in a case of observing a vertical cross section of the polymer film with respect to the surface of the polymer film with a scanning electron microscope, a plurality of island-shaped regions consisting of the component are observed in an observation region, and an equivalent circle diameter of the island-shaped regions is 0.001 to 10 μm.

9. The polymer film according to claim 8,
wherein a proportion of a total area of the island-shaped regions to an area of the observation region with the scanning electron microscope is 1% to 60%.

10. The polymer film according to claim 9,
wherein a material constituting the inorganic particles is at least one selected from the group consisting of silica, titanium oxide, barium sulfate, talc, zirconia, alumina, silicon nitride, silicon carbide, calcium carbonate, silicate, glass bead, graphite, tungsten carbide, carbon black, clay, mica, carbon fiber, glass fiber, and metal powder.

11. The polymer film according to claim 9,
wherein a distance between the island-shaped regions is 0.0001 to 5 μm.

12. The polymer film according to claim 8,
wherein a distance between the island-shaped regions is 0.0001 to 5 μm.

13. The polymer film according to claim 1,
wherein a material constituting the inorganic particles is at least one selected from the group consisting of silica, titanium oxide, barium sulfate, talc, zirconia, alumina, silicon nitride, silicon carbide, calcium carbonate, silicate, glass bead, graphite, tungsten carbide, carbon black, clay, mica, carbon fiber, glass fiber, and metal powder.

14. The polymer film according to claim 1,
wherein a proportion of a Young's modulus in a second direction in a plane of the polymer film orthogonal to a first direction to a Young's modulus in the first direction in the plane of the polymer film is 0.5 to 1.9.

15. The polymer film according to claim 1,
wherein a proportion of a dielectric loss tangent in a second direction in a plane of the polymer film orthogonal to a first direction to a dielectric loss tangent in the first direction in the plane of the polymer film is 0.5 to 1.5.

16. The polymer film according to claim 1,
wherein a proportion of a dielectric constant in a second direction in a plane of the polymer film orthogonal to a first direction to a dielectric constant in the first direction in the plane of the polymer film is 0.5 to 1.5.

17. The polymer film according to claim 1,
wherein a proportion of a linear expansion factor in a second direction in a plane of the polymer film orthogonal to a first direction to a linear expansion factor in the first direction in the plane of the polymer film is 0.5 to 1.8.

18. The polymer film according to claim 1,
wherein an arithmetic average surface roughness Ra of the surface of the polymer film is 400 nm or less.

19. The polymer film according to claim 1,
wherein a thickness is 5 to 1100 μm.

20. A substrate for communication comprising:
the polymer film according to claim 1.

* * * * *